United States Patent
Hopkins et al.

(10) Patent No.: US 11,374,226 B2
(45) Date of Patent: *Jun. 28, 2022

(54) CORROSION MITIGATION OF BATTERY ELECTRODES

(71) Applicant: Massachusetts Institute of Technology, Cambridge, MA (US)

(72) Inventors: Brandon James Hopkins, Cambridge, MA (US); Douglas P. Hart, Charlestown, MA (US); Yang Shao-Horn, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/393,645

(22) Filed: Apr. 24, 2019

(65) Prior Publication Data

US 2019/0326603 A1    Oct. 24, 2019

Related U.S. Application Data

(60) Provisional application No. 62/661,724, filed on Apr. 24, 2018.

(51) Int. Cl.
*H01M 4/62*     (2006.01)
*H01M 10/054*   (2010.01)
(Continued)

(52) U.S. Cl.
CPC ......... *H01M 4/628* (2013.01); *H01M 10/054* (2013.01); *H01M 12/08* (2013.01);
(Continued)

(58) Field of Classification Search
None
See application file for complete search history.

(56) References Cited

U.S. PATENT DOCUMENTS 4,548,878 A   10/1985  Gordon
4,916,036 A    4/1990  Cheiky
(Continued)

FOREIGN PATENT DOCUMENTS

WO    WO-2013150520    10/2013
WO    WO-2017176390    10/2017

OTHER PUBLICATIONS

EPO, , "Application Serial No. PCT/US17/20093, Invitation to Pay Additional Fees and Partial Int'l Search dated May 12, 2017", , 14 pages.

(Continued)

*Primary Examiner* — Carmen V Lyles-Irving
(74) *Attorney, Agent, or Firm* — Strategic Patents, P.C.

(57) ABSTRACT

Corrosion mitigation in a battery may include displacing a first flowable medium with a second flowable medium along a first electrode to interrupt fluid communication of the first flowable medium with the first electrode—thus interrupting operation of the battery—while a second electrode remains in contact with a flowable medium (e.g., one or more of the first flowable medium or another flowable medium, such as a gel). For example, a membrane (e.g., an underwater oleophobic material) may be disposed between the first electrode and the second electrode. An oil may displace an aqueous electrolyte on a first side of the membrane toward a metallic electrode while the aqueous form of the electrolyte remains in contact with an air electrode on a second side of the separator membrane disposed toward the air electrode.

13 Claims, 11 Drawing Sheets

(51) Int. Cl.
*H01M 50/46* (2021.01)
*H01M 50/60* (2021.01)
*H01M 50/571* (2021.01)
*H01M 12/08* (2006.01)
*H01M 50/449* (2021.01)
*H01M 4/02* (2006.01)

(52) U.S. Cl.
CPC ......... *H01M 50/449* (2021.01); *H01M 50/46* (2021.01); *H01M 50/571* (2021.01); *H01M 50/60* (2021.01); *H01M 2004/023* (2013.01)

(56) References Cited

U.S. PATENT DOCUMENTS

| | | | |
|---|---|---|---|
| 2012/0041624 A1 | 2/2012 | Stewart et al. | |
| 2013/0285597 A1* | 10/2013 | Goldstein | H01M 10/44 320/107 |
| 2013/0306565 A1* | 11/2013 | Davis | C02F 1/46104 210/675 |
| 2015/0171494 A1 | 6/2015 | Tzidon et al. | |
| 2017/0222288 A1 | 8/2017 | Ashfield et al. | |
| 2019/0123407 A1 | 4/2019 | Hopkins et al. | |

OTHER PUBLICATIONS

WIPO, , "PCT Application No. PCT/US17/20093 International Preliminary Report on Patentability dated Oct. 18, 2018", , 12 pages.

EPO, , "PCT Application No. PCT/US17/20093 International Search Report and Written Opinion dated Jul. 4, 2017", , 18 pages.

USPTO, "U.S. Appl. No. 16/091,897 Non-Final Office Action dated Apr. 13, 2021", 9 pages.

USPTO, "U.S. Appl. No. 16/091,897 Notice of Allowance dated Oct. 13, 2021", 8 pages.

* cited by examiner

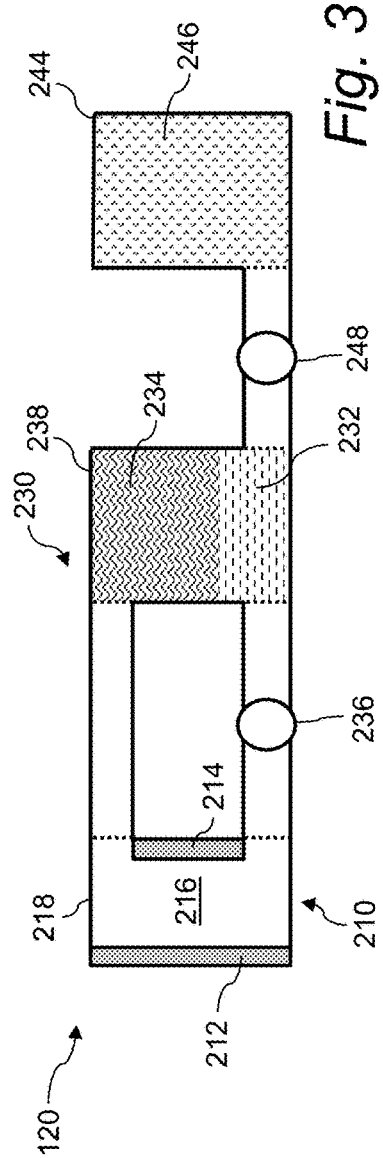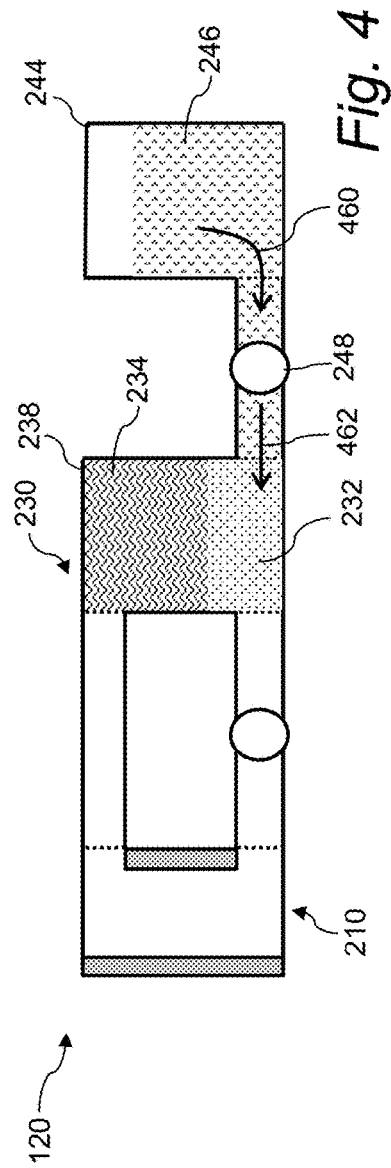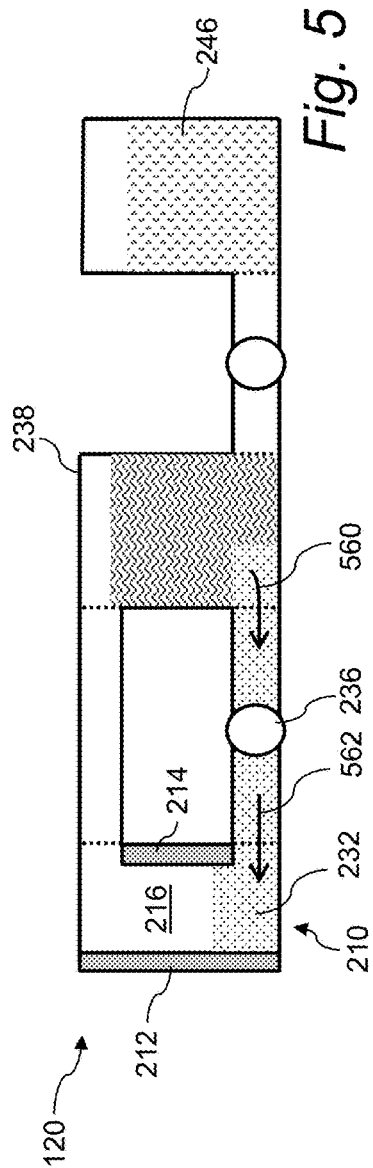

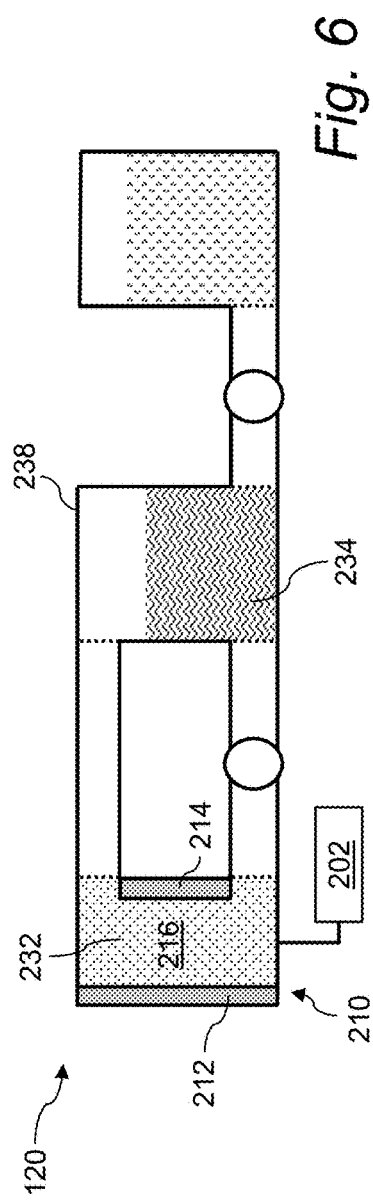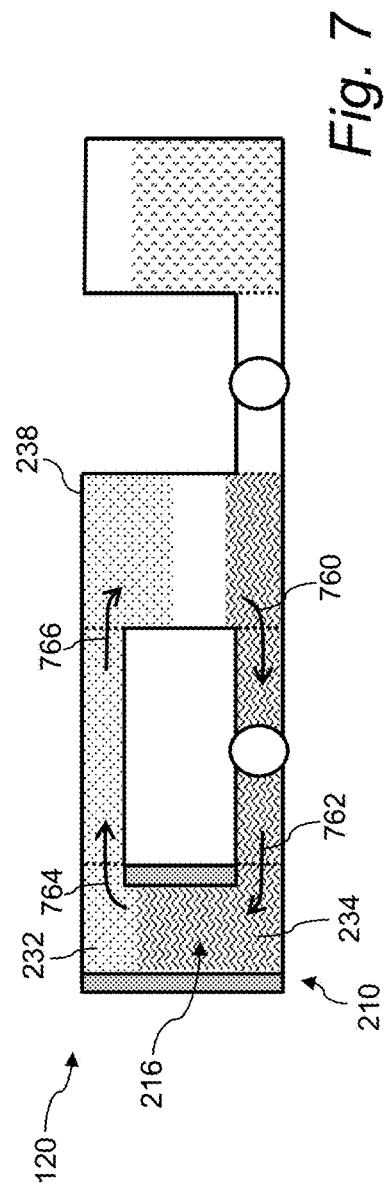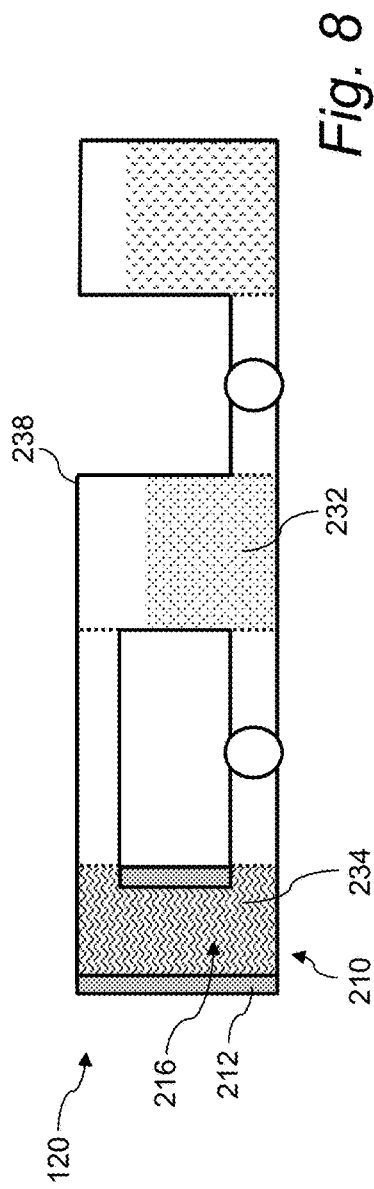

CORROSION MITIGATION OF BATTERY ELECTRODES

CROSS-REFERENCE TO RELATED APPLICATIONS

This application claims priority to U.S. Provisional Application No. 62/661,724, filed on Apr. 24, 2018, the entire contents of which are hereby incorporated herein by reference.

GOVERNMENT LICENSE RIGHTS

This invention was made with government support under Contract No. FA8721-05-C-0002 awarded by the United States Air Force. The government has certain rights in the invention.

TECHNICAL FIELD

The disclosure generally relates to mitigating corrosion of electrodes in batteries.

BACKGROUND

Metal-air batteries, such as aluminum-air (Al-air) batteries, have a relatively high pack-level gravimetric energy density compared to other batteries (e.g., greater than about 450 watt-hours per kilogram or Wh $kg^{-1}$), and are formed of abundant, recyclable, low weight, and low-cost metals. These characteristics are advantageous with respect to certain commercial implementations. However, many metal-air batteries are susceptible to open-circuit anode corrosion, which can cause severe capacity fade when a metal-air battery is deactivated. For example, when an electrolyte is removed from contact with a metallic anode, some electrolyte may remain in contact with the metallic anode and, through exposure to air, may corrode the metallic anode.

SUMMARY

Corrosion mitigation in a battery may include displacing a first flowable medium with a second flowable medium along a first electrode to interrupt fluid communication of the first flowable medium with the first electrode—thus interrupting operation of the battery—while a second electrode remains in contact with a flowable medium (e.g., one or more of the first flowable medium or another flowable medium, such as a gel). For example, a membrane (e.g., an underwater oleophobic material) may be disposed between the first electrode and the second electrode. An oil may displace an aqueous electrolyte on a first side of the membrane toward a metallic electrode while the aqueous form of the electrolyte remains in contact with an air electrode on a second side of the separator membrane disposed toward the air electrode.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals identify corresponding elements.

FIG. 3 is a schematic representation of the metal-air battery system of FIG. 2 in a first state of operation.

FIG. 4 is a schematic representation of the metal-air battery system of FIG. 2 in a second state of operation.

FIG. 5 is a schematic representation of the metal-air battery system of FIG. 2 in a third state of operation.

FIG. 6 is a schematic representation of the metal-air battery system of FIG. 2 in a fourth state of operation.

FIG. 7 is a schematic representation of the metal-air battery system of FIG. 2 in a fifth state of operation.

FIG. 8 is a schematic representation of the metal-air battery system of FIG. 2 in a sixth state of operation.

DETAILED DESCRIPTION

Figure 1:
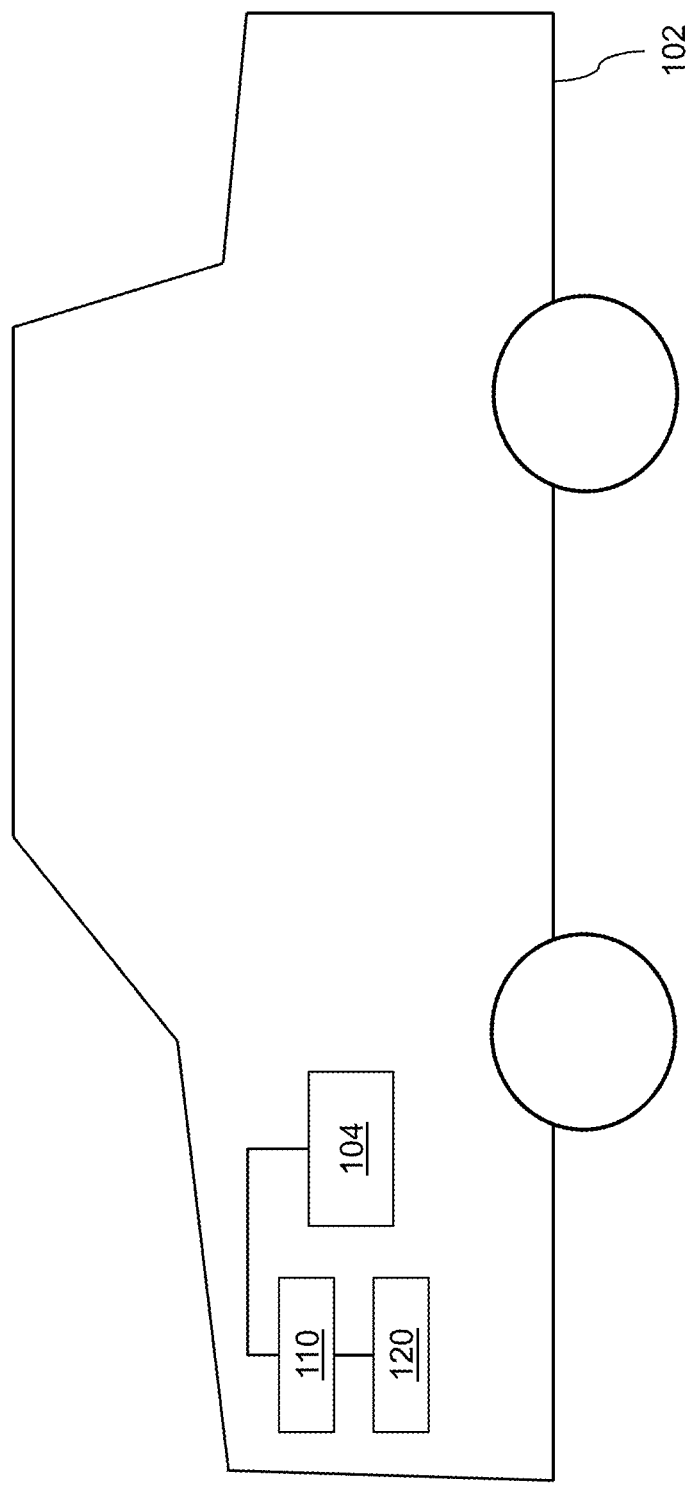
FIG. 1 is a schematic representation of a battery electric vehicle (BEV) including a metal-air battery system.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term "or" should generally be understood to mean "and/or," and the term "and" should generally be understood to mean "and/or".

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended to better describe the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms, unless specifically stated.

In general, described herein are devices, systems, and methods for mitigating corrosion of electrodes in batteries. For the sake of clear and efficient explanation these devices, systems, and methods are described with respect to examples including metal-air batteries. However, unless otherwise specified or made clear from the context, it will be understood that the devices, systems, methods, and techniques described herein may also, or instead, be used for, or may otherwise be adapted for use with, other types of batteries, such as metal-seawater batteries, or generally other electrochemical devices including one or more metal electrodes that are susceptible to corrosion that may degrade performance of the electrochemical device over time. Although the description may emphasize mitigating corrosion in aluminum-air (Al-air) batteries, it will be understood that the devices, systems, and methods of the present disclosure may include other metal-air batteries including, without limitation, zinc-air (Zn-air) batteries. Further for the sake of clear and efficient explanation, the devices, systems, and methods described herein are generally described in the context of batteries included in a battery electric vehicle. It should be appreciated, however, that the devices, systems, and methods of the present disclosure are generally applicable to batteries in any of various different applications, unless otherwise specified or made clear from the context. By way of example, and not limitation, the devices, systems, and methods of the present disclosure are generally applicable to batteries in any manner and form of applications, which may include, without limitation, power tools, portable electronic devices, generators, portable power systems, spacecraft, electrical appliances, or combinations thereof.

FIG. 1 is a schematic representation of a battery electric vehicle (BEV). In FIG. 1, a BEV 102 may include a motor 104, a rechargeable battery 110, and a metal-air battery system 120. The motor 104, the rechargeable battery 110, and the metal-air battery system 120 may be electrically coupled to one another. The rechargeable battery 110 may include, for example, a lithium-ion (Li-ion) battery, or another electrically rechargeable battery, e.g., connected as a primary power source for the motor 104 of the BEV 102. The metal-air battery system 120 may include a metal-air battery (e.g., a metal-air battery 210, described below with respect to FIG. 2) operable to charge the rechargeable battery 110 when the electrical production capability of the rechargeable battery 110 reaches a certain threshold amount or otherwise becomes depleted. In this manner, when the BEV 102 is away from a stationary power source for recharging the rechargeable battery 110, the metal-air battery system 120 on board the BEV 102 may act as a range extender that charges the rechargeable battery 110, thus facilitating travel beyond the range of the rechargeable battery 110 alone. Such range extension may be useful, for example, for mitigating range anxiety associated with battery-electric vehicles (BEVs).

Because the metal-air battery system 120 may be used relatively infrequently (e.g., when the rechargeable battery 110 is beyond a depletion threshold and a stationary power source is not available), the metal-air battery system 120 may include a metal-air battery that can be stored for relatively long periods of time between uses and can be mechanically recharged during regular maintenance procedures, such as a tire change, of the BEV 102. More specifically, as described in greater detail below, the metal-air battery system 120 may include a liquid and an electrolyte movable in a fluid circuit to displace one another in contact with a metal anode of a metal-air battery to reduce the likelihood of corrosion of the metal anode between uses, e.g., over the course of multiple charging cycles of the rechargeable battery 110. Such a reduction of the likelihood of corrosion of the metal anode can reduce performance degradation of the metal-air battery of the metal-air battery system 120, as compared to metal-air batteries in which a metal anode is stored in air between uses.

In general, the BEV 102 may include a terrestrial vehicle, an aerial vehicle, an aquatic vehicle, or combinations thereof. More specifically, the BEV 102 may include an automobile, an airplane, or a boat. Additionally, or alternatively, the BEV 102 may include a manned or an unmanned vehicle (e.g., a drone).

One or more of the rechargeable battery 110 and the metal-air battery system 120 may provide power to other components of the BEV 102, e.g., in combination with, or instead of, providing power to the motor 104. For example, one or more of the rechargeable battery 110 and the metal-air battery system 120 may provide power to non-propulsion related devices of the BEV 102 such as auxiliary electronic components, e.g., a radio, an entertainment system, a light, an auxiliary motor such as for a window or a door, a heating system, a cooling system, and combinations thereof. Also, although two batteries are shown in FIG. 1, in certain implementations, the BEV 102 may include only a single battery (e.g., a metal-air battery of the metal-air battery system 120), or the BEV 102 may include more than two batteries.

The metal-air battery system 120 may include, for example, an Al-air battery. As compared to other types of batteries, the Al-air battery may be useful as a secondary battery in the BEV 102 at least because the Al-air battery has a relatively high pack-level gravimetric energy density. For example, some commercially available Al-air battery packs, such as those designed for military applications, can reach energy densities up to about 467 watt-hours per kilogram (Wh kg$^{-1}$). Aluminum is also relatively abundant, recyclable, lightweight, and inexpensive.

In general, a discharge reaction for an Al-air battery under closed-circuit conditions may proceed as described in Eqs. 1 and 2 below.

$$O_2 + 2H_2O + 4e \rightarrow 4OH \quad \text{(Eq. 1)}$$

$$Al + 4OH \rightarrow Al(OH)_4 + 3e \quad \text{(Eq. 2)}$$

As shown in Eq. 1, oxygen from outside an Al-air battery may enter the battery (e.g., a casing or housing of the battery) through an air cathode (e.g., an air-breathing cathode) where the oxygen reacts with water and electrons to create hydroxides. These hydroxides may then travel through an aqueous electrolyte solution, such as a sodium hydroxide (NaOH) electrolyte solution or a potassium hydroxide (KOH) electrolyte solution, until the hydroxides reach an aluminum anode of the Al-air battery. At the anode, the hydroxides may react with the aluminum yielding a waste product, aluminate, and electrons that can perform useful work as outlined in Eq. 2.

During both discharge and deactivated conditions in which water remains in contact with the aluminum anode, a parasitic reaction referred to as "corrosion" may consume the aluminum anode, robbing the Al-air battery of aluminum that otherwise could produce electricity according to the reactions in Eq. 1 and Eq. 2. An example of a corrosion reaction is described below in Eq. 3.

$$2Al + 6H_2O \rightarrow 2Al(OH)_3 + 3H_2 \quad \text{(Eq. 3)}$$

As shown in Eq. 3, ionically conductive water in the electrolyte, which provides for the transport of hydroxides, may react with aluminum to form a waste product, aluminum trihydroxide, and hydrogen gas. As described in greater detail below, the devices, systems, and methods of the present disclosure may reduce the likelihood of corrosion occurring through the reaction in Eq. 3, or analogous corrosion reactions (e.g., in other types of metal-air batteries), by interrupting contact between a metal electrode and a corrosive material during a deactivated (open-circuit) condition in which the battery is between uses. Thus, as also described in greater detail below, the devices, systems, and methods of the present disclosure can reduce open-circuit corrosion, and the associated rapid capacity fade, as compared to exposing the metal anode to air in between uses.

In certain instances, corrosion mitigation devices, systems, and methods of the present disclosure may include displacing a flowable form of an electrolyte within a gap of a metal-air battery with a liquid that is substantially non-reactive with an electrolyte. The metal anode may have less reactivity with the liquid than with the flowable form of the electrolyte. It should be understood that such displacement of the flowable form of the electrolyte from the gap may take place when the metal-air battery is in a deactivated state (e.g., prior to an initial use or between uses). The liquid may remain in the gap of the metal-air battery to reduce the likelihood of corrosion of the metallic anode and, thus, may reduce a power drain of the metal-air battery, as compared to leaving the metallic anode exposed to the electrolyte and/or air, when the battery is in a deactivated state (e.g., a state coinciding with an open circuit condition of the metal-air battery in which electricity production of the metal-air battery is interrupted). To place the metal-air battery in an activated state (e.g., a state coinciding with a closed-circuit condition in which electricity can be produced in the metal-air battery), the flowable form of the electrolyte may be moved into the gap to displace the liquid for generating electrical power. Thus, it should be appreciated that the liquid and the flowable form of the electrolyte can displace one another in the gap of the metal-air battery to facilitate intermittent operation of the metal-air battery over the course of a prolonged period with a reduced degradation in performance, as compared to leaving an electrolyte in contact with a metal anode or leaving the metal anode exposed to air between uses.

Figure 2:
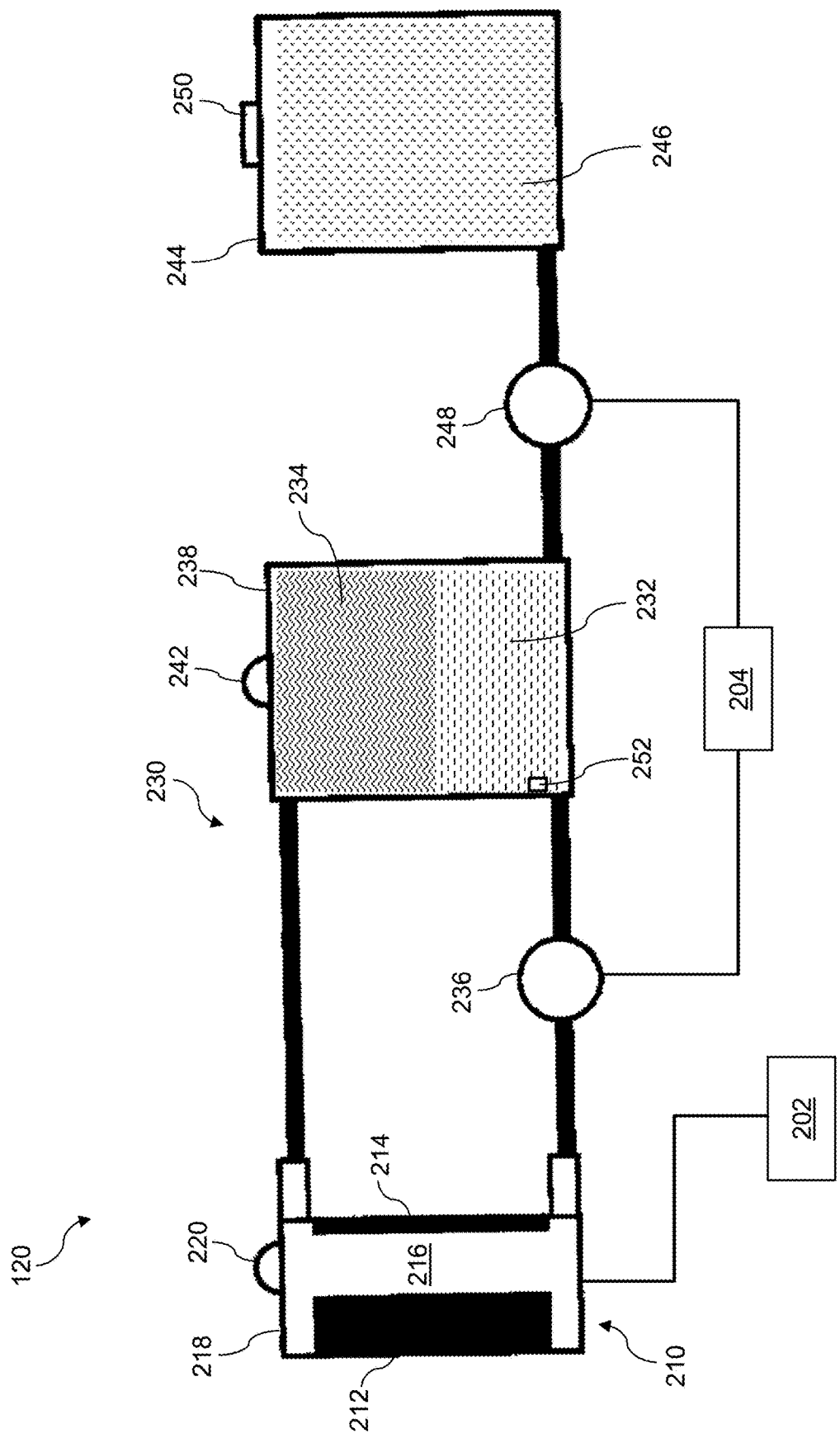
FIG. 2 is a schematic representation of an instance of the metal-air battery system of FIG. 1.

FIG. 2 is a schematic representation of an instance of a metal-air battery system 120. As described in greater detail below, in certain implementations, the metal-air battery system 120 may mitigate corrosion and capacity fade in a metal-air battery 210 by limiting exposure of portions of the metal-air battery 210 to an electrolyte, air, or both between uses.

The metal-air battery system 120 may include a fluid circuit 230 in fluid communication with the metal-air battery 210. The fluid circuit 230 may include a liquid 234 and a flowable form of an electrolyte 232. In use, the liquid 234 may be movable from the fluid circuit 230 to displace the flowable form of the electrolyte 232 present in the metal-air battery 210 when the metal-air battery 210 switches from an activated state to a deactivated state. Additionally, or alternatively, the flowable form of the electrolyte 232 may be movable from the fluid circuit 230 to displace the liquid 234 present in the metal-air battery system 120 when the metal-air battery system 120 switches from the deactivated state to the activated state.

The metal-air battery 210 may include a metallic anode 212 and an air cathode 214 spaced apart from the metallic anode 212, such that the air cathode 214 and the metallic anode 212 define a gap 216 within the metal-air battery 210. The metal-air battery 210 may further, or instead, include a housing 218 disposed about at least a portion of the metallic anode 212, the air cathode 214, and the gap 216.

The metallic anode 212 may include any of various different materials suitable for generating electricity upon exposure to the flowable form of the electrolyte 232. For the sake of clarity of explanation, the metallic anode 212 may be described herein as being formed of aluminum such that the metal-air battery 210 is an Al-air battery that can, in certain implementations, produce electricity according to Eq. 1 and Eq. 2 above. Unless otherwise specified or made clear from the context, however, it should be appreciated that the metallic anode 212 may further, or instead, include any one or more other materials, including materials participating in primary reactions on the surface of the metallic anode 212 and ancillary materials present, for example, for supporting the metallic anode 212. Examples of other materials include zinc, germanium, calcium, iron, lithium, magnesium, potassium, sodium, silicon, tin, and combinations thereof. In certain implementations, the metallic anode 212 includes pure metal. In some implementations, the metallic anode 212 includes an alloy of a metal. The metallic anode 212 may be wholly disposed within the housing 218, where the metallic anode 212 is generally protected from an external environment.

The air cathode 214 may allow air or another oxygen containing fluid, substance, or solution into the gap 216 of the metal-air battery 210 for reacting with the flowable form of the electrolyte 232. The combination of oxygen and the flowable form of the electrolyte 232 may react with the metallic anode 212 to produce electricity (e.g., as indicated in Eq. 1 and 2 with respect to the reaction with aluminum). It should be appreciated that, in certain implementations, a seawater-breathing cathode may be used in addition to, or instead of, the air cathode 214 without departing from the scope of the present disclosure.

In certain implementations, the air cathode 214 may include a reactive layer of carbon having one or more of a nickel-grid current collector, a catalyst (e.g., cobalt), and a porous hydrophobic polytetrafluoroethylene (PTFE) film that may prevent leakage of the electrolyte 232. Continuing with this example, oxygen in the air of the external environment may pass through the PTFE of the air cathode 214, such that the oxygen reacts with water in an aqueous solution of the electrolyte 232 to create hydroxide ions. The hydroxide ions may react with the metallic anode 212 (e.g., according to Eqs. 1 and 2 above) to yield a waste product (e.g., aluminate) and electrons that can perform useful work. To facilitate the passage of air through the air cathode 214 from the external environment, the air cathode 214 may be partially disposed within the housing 218. To facilitate escape of a waste product or other gases from the gap 216 of the metal-air battery 210, the housing 218 may include a first membrane 220 permeable to hydrogen gas and substantially impermeable to the liquid 234 and the flowable form of the electrolyte 232. While the first membrane 220 is described as being a single membrane, it should be appreciated that the first membrane 220 may include a plurality of membranes.

One or more of the metallic anode 212 and the air cathode 214 may be substantially hydrophilic. For example, the metallic anode 212 may be naturally hydrophilic. Additionally, or alternatively, the air cathode 214 may be configured to be hydrophilic. In certain implementations in which the flowable form of the electrolyte 232 includes an aqueous solution, the hydrophilicity of the metallic anode 212 and the air cathode 214 can facilitate displacing the liquid 234 from the surface of the metallic anode 212 and the air cathode 214 such that the liquid 234 does not foul the surface of, or otherwise degrade performance of, the metallic anode 212 or the air cathode 214.

The fluid circuit 230 may be in fluid communication with the metal-air battery 210, and more specifically, with the gap 216 of the metal-air battery 210. The fluid circuit 230 may generally include one or more of piping, reservoirs, pumps, and combinations thereof, such that the flowable form of the electrolyte 232 and the liquid 234 are movable between the fluid circuit 230 and the gap 216. For example, the flowable form of the electrolyte 232 and the liquid 234 can displace one another from each of the fluid circuit 230 and the gap 216 when being moved between the fluid circuit 230 and the gap 216. Further, or instead, the fluid circuit 230 and the gap 216 may define a substantially closed system as different substances (e.g., the liquid 234 and a flowable form of the electrolyte 232) are displaced back and forth in the gap 216. It will be understood that a "substantially closed system" in this context includes a completely closed system (e.g., a hermetically sealed system), as well as partially closed systems in which the liquid 234 and the flowable form of the electrolyte 232 are sealed within the system, but air, hydrogen, or other fluids may enter or leave the system.

It will be understood that the flowable form of the electrolyte 232 may include one or more movable forms of the electrolyte. For example, the flowable form of the electrolyte 232 may include the electrolyte in a liquid state, a substantially liquid state (e.g., a gel), a gaseous state, a powder, a solid state, and combinations thereof. More generally, it should be understood that, as used herein, the flowable form of the electrolyte 232 includes any form of electrolyte that can be made to flow through the fluid circuit 230 through the exertion of force and/or through the addition of a fluid, a gel, or other similar carrier. In certain implementations, water or another carrier can be added to the fluid circuit 230 such that the flowable form of the electrolyte 232 can flow into the gap 216 of the metal-air battery 210 to begin production of electricity in an activated state of the metal-air battery 210. In certain instances, the metal-air battery system 120 may include one or more crystallizers 252 that maintain a predetermined conductivity of the flowable form of the electrolyte 232.

The flowable form of the electrolyte 232 may include one or more of an aqueous solution of the electrolyte, a gel containing the electrolyte, a powder, crystallized electrolytes, and combinations thereof.

The flowable form of the electrolyte 232 may be reactive with the metallic anode 212 as described herein, and conductive between the metallic anode 212 and the air cathode 214 as described herein. The flowable form of the electrolyte 232 may include, for example, one or more of sodium hydroxide and potassium hydroxide. The flowable form of the electrolyte 232 may also, or instead, include one or more of a polymer, an alcohol, an organic substance, an inorganic substance, an ionic substance, and combinations thereof.

The liquid 234 may be substantially nonreactive with the flowable form of the electrolyte 232, such that the flowable form of the electrolyte 232 is less reactive with the liquid 234 than with the metallic anode 212. The liquid 234 being substantially nonreactive with the flowable form of the electrolyte 232 may also, or instead, include that a majority of the total mass both of the liquid 234 and the flowable form of the electrolyte 232 do not react with one another under normal operating conditions of the metal-air battery 210 (e.g., normal operating temperatures and pressures) for certain predetermined time periods (e.g., a predicted life of the metal-air battery 210, a predicted time span between services of the metal-air battery 210 or an electrical load 202, or a certain number of uses of the metal-air battery 210). In this manner, the liquid 234 and the flowable form of the electrolyte 232 can be in the fluid circuit 230 without causing adverse chemical reactions within the metal-air battery system 120. For example, both the liquid 234 and the flowable form of the electrolyte 232 may be included simultaneously in a single reservoir of the fluid circuit 230, prior to an initial activation of the metal-air battery system 120. Additionally, or alternatively, the liquid 234 and the flowable form of the electrolyte 232 may displace one another within one or more of the gap 216 and the fluid circuit 230 without causing adverse chemical reactions within the metal-air battery system 120 (or limiting such reactions).

Additionally, or alternatively, the metallic anode 212 may be less reactive with the liquid 234 than the metallic anode 212 is with the flowable form of the electrolyte 232. In this manner, when the liquid 234 is disposed in the gap 216, fewer chemical reactions may occur between the metallic anode 212 and the liquid 234 as compared to when the flowable form of the electrolyte 232 is disposed in the gap 216. Limiting these reactions may assist in mitigating corrosion of the metallic anode 212.

The liquid 234 may also, or instead, be less conductive than the flowable form of the electrolyte 232. In such instances, when the liquid 234 is disposed in the gap 216, fewer ions travel between the air cathode 214 and the metallic anode 212 as compared to when the flowable form of the electrolyte 232 is disposed in the gap 216. Limiting such conductivity may assist in mitigating corrosion of the metallic anode 212 or capacity fade of the metal-air battery 210.

The liquid 234 may also, or instead, be substantially immiscible with the flowable form of the electrolyte 232. In certain implementations, a majority of the total mass both of the liquid 234 and the flowable form of the electrolyte 232 does not mix with one another under normal operating conditions of the metal-air battery 210 (e.g., normal operating temperatures and pressures) for certain predetermined time periods (e.g., a predicted life of the metal-air battery 210, a predicted time span between services of the metal-air battery 210 or the electrical load 202, or a certain number of uses of the metal-air battery 210). In this manner, the liquid 234 and the flowable form of the electrolyte 232 may be in the fluid circuit 230 without mixing, or with limited mixing.

For example, both the liquid 234 and the flowable form of the electrolyte 232 may be included in a single reservoir of the fluid circuit 230 prior to an initial activation of the metal-air battery 210, where the liquid 234 and the flowable form of the electrolyte 232 remain substantially separate. Additionally, or alternatively, the liquid 234 and the flowable form of the electrolyte 232 may displace one another within one or more of the gap 216 and the fluid circuit 230 without mixing with one another, or with limited mixing.

The liquid 234 may also, or instead, have a different density than the flowable form of the electrolyte 232 at room temperature or at another temperature (or at other environmental conditions, e.g., pressure) suitable for operation of the metal-air battery 210. The liquid 234 having a different density than the flowable form of the electrolyte 232, which may facilitate placement of one or more of the liquid 234 and the flowable form of the electrolyte 232 in a predetermined location in the fluid circuit 230 (e.g., prior to an initial activation of the metal-air battery 210). By way of example, the liquid 234 and the flowable form of the electrolyte 232 may be substantially immiscible with respect to one another, and include different densities, where the liquid 234 and the flowable form of the electrolyte 232 are each located in the same reservoir prior to an initial activation of the metal-air battery system 120. The properties of the liquid 234 and the flowable form of the electrolyte 232 may allow for the flowable form of the electrolyte 232 to be disposed in a location of such a reservoir that is separated from the liquid 234 such that the flowable form of the electrolyte 232 can travel into the gap 216 upon an initial activation of the metal-air battery 210.

The liquid 234 may also, or instead, be substantially inviscid to promote ease of movement of the liquid 234 in the fluid circuit 230.

In certain implementations, the liquid 234 may include an oil. Unless otherwise indicated or made clear from the context, an oil may include any nonpolar chemical substance that is a viscous liquid at ambient temperature (e.g., 20° C.) and is both hydrophobic and lipophilic. Thus, by way of example and not limitation, the liquid 234 may include one or more of a mineral oil and a silicone oil. Such oils may be advantageous, for example, in the metal-air battery system 120 in which the flowable form of the electrolyte 232 is an aqueous solution, where the oil and the aqueous solution are substantially immiscible, the oil is less conductive than the aqueous solution, and the oil is less reactive with the metallic anode 212 than the flowable form of the electrolyte 232. The liquid 234 may also, or instead, include other oil-like fluids to displace the flowable form of the electrolyte 232 in the metal-air battery system 120.

The liquid 234 may be movable in the fluid circuit 230 to displace the flowable form of the electrolyte 232 in the fluid circuit 230. Similarly, the flowable form of the electrolyte 232 may be movable in the fluid circuit 230 to displace the liquid 234 in the fluid circuit 230.

As stated above, the fluid circuit 230 may include one or more of piping, reservoirs, pumps, and combinations thereof. For example, the fluid circuit 230 may include a first pump 236. The first pump 236 may be actuatable to displace one of the liquid 234 and the flowable form of the electrolyte 232 in the gap 216 with the other one of the liquid 234 and the flowable form of the electrolyte 232 from the fluid circuit 230. For example, the first pump 236 may be actuatable to displace the flowable form of the electrolyte 232 in the gap 216 with the liquid 234 from the fluid circuit 230, where the flowable form of the electrolyte 232 moves into the fluid circuit 230 from the gap 216 upon displacement by the liquid 234. Similarly, the first pump 236 may be actuatable to displace liquid 234 in the gap 216 with the flowable form of the electrolyte 232 from the fluid circuit 230, where the liquid 234 moves into the fluid circuit 230 from the gap 216 upon displacement of the liquid 234 by the flowable form of the electrolyte 232.

Because the first pump 236 may be actuatable to displace liquid 234 in the gap 216 with a flowable form of the electrolyte 232 from the fluid circuit 230, the first pump 236 may act as a switch, or may be in electrical communication with a switch or other controller 204, (e.g., for controlling electrical and ionic communication of the metallic anode 212 with the air cathode 214 between an activated state and a deactivated state of the metal-air battery 210). For example, the first pump 236 may be actuatable via a controller 204 to displace one of the liquid 234 and the flowable form of the electrolyte 232 in the gap 216 with the other one of the liquid 234 and the flowable form of the electrolyte 232 as the controller 204 is moved or otherwise manipulated between an activated state and a deactivated state. In this manner, the controller 204 can be, for example, a switch, or the controller 204 may otherwise include a switch.

The fluid circuit 230 may also, or instead, include a first reservoir 238. The first reservoir 238 may hold one of the liquid 234 and the flowable form of the electrolyte 232, while the other one of the liquid 234 and the flowable form of the electrolyte 232 is disposed in the gap 216. For example, first pump 236 may be actuatable to move one of the liquid 234 and a flowable form of the electrolyte 232 from the first reservoir 238 to the gap 216 of the metal-air battery system 120, or vice-versa, where movement of one of the liquid 234 and the flowable form of the electrolyte 232 from the first reservoir 238 to the gap 216 displaces the other one of the liquid 234 and the flowable form of the electrolyte 232 from the gap 216 to the first reservoir 238.

The first reservoir 238 may include a second membrane 242 permeable to hydrogen gas and substantially impermeable to the liquid 234 and the flowable form of the electrolyte 232. The second membrane 242 may allow a waste product or other gases to escape the first reservoir 238, which may facilitate movement of one or more of the liquid 234 and the flowable form of the electrolyte 232 within the fluid circuit 230.

The metal-air battery system 120 may, further or instead, include a second reservoir 244. The second reservoir 244 may be disposed, for example, in fluid communication with the first reservoir 238. The second reservoir 244 may include a carrier 246 movable from the second reservoir 244 to the fluid circuit 230, to the metal-air battery 210, or both. For example, in certain implementations, the carrier 246 may be movable from the second reservoir 244 to the first reservoir 238 for mixing with the flowable form of the electrolyte 232. The mixture of the carrier 246 and the electrolyte 232 may have a greater flowability than the flowable form of the electrolyte 232 alone. For example, the carrier 246 may increase the flowability of the flowable form of the electrolyte 232 by decreasing the viscosity of the flowable form of the electrolyte 232.

The carrier 246 may include a liquid, such as liquid water. Thus, in certain implementations, the mixture of the carrier 246 and the flowable form of the electrolyte 232 may include an aqueous solution of the electrolyte 232. For example, the flowable form of the electrolyte 232 may include a powder, and the carrier 246 may include water. Continuing with this example, the mixture of the flowable form of the electrolyte 232 and the water creates an aqueous solution containing the powder. The carrier 246 may also, or instead, include a gel.

The metal-air battery system 120 may include a second pump 248 in fluid communication with the second reservoir 244. In certain implementations, the second pump 248 is disposed between the first reservoir 238 and the second reservoir 244 and the second pump 248 may be actuatable to supply the carrier 246 from the second reservoir 244 to the first reservoir 238.

The second reservoir 244 may include a third membrane 250, which can be permeable to a gas (e.g., air) and substantially impermeable to the carrier 246. The membrane may allow for movement of the carrier 246 from the second reservoir 244 to the fluid circuit 230. One or more of the membranes in the metal-air battery system 120 may be sealable (e.g., when the metal-air battery 210 is not in use).

Referring now to FIGS. 1 and 2, the metal-air battery system 120 may be in electrical communication with an electrical load 202 associated with the BEV 102. For example, the electrical load 202 may include a load associated with the rechargeable battery 110, other electrical components of the BEV 102, or a combination thereof. For example, displacement of the liquid 234 from the gap 216 by the flowable form of the electrolyte 232 may start electrical generation in the metal-air battery 210 to recharge the rechargeable battery 110.

It will be understood that, while the metal-air battery system 120 shown in FIG. 2 shows a single metal-air battery 210, the metal-air battery system 120 may instead include a plurality of metal-air batteries 210 arranged in the form of a multi-cell battery.

FIG. 3 is a schematic representation of the metal-air battery system 120 in a first state of operation. It will be understood that the various states of operation described herein with reference to FIGS. 3-8 are provided by way of example and not of limitation. The first state of operation for the metal-air battery system 120 may be a state of operation prior, for example, to an initial activation of the metal-air battery 210.

As discussed above, the metal-air battery 210 may include a metallic anode 212, an air cathode 214, and a housing 218, where there is a space in the housing 218 between the metallic anode 212 and the air cathode 214 defining a gap 216. The metal-air battery system 120 may further include a fluid circuit 230 in fluid communication with the metal-air battery 210, and more particularly, a fluid circuit 230 in fluid communication with the gap 216 of the metal-air battery 210. The fluid circuit 230 may include a first reservoir 238 in fluid communication with the metal-air battery 210, e.g., through a piping system including one or more pipes. The fluid circuit 230 may further include a first pump 236 disposed between the metal-air battery 210 and the first reservoir 238. The metal-air battery system 120 may also include a second reservoir 244 in fluid communication with the first reservoir 238, and a second pump 248 disposed between the first reservoir 238 and the second reservoir 244.

In the first state of operation for the metal-air battery system 120, the first reservoir 238 may contain both a flowable form of the electrolyte 232 and a liquid 234. The flowable form of the electrolyte 232 may be any as described herein, e.g., including one or more of sodium hydroxide and potassium hydroxide. For example, the flowable form of the electrolyte 232 may include one or more of an aqueous solution of the electrolyte, a gel including the electrolyte, a powder, or a substantially solid mass. The liquid 234 may be any as described herein. For example, the liquid 234 may have one or more of the following properties: (i) the liquid 234 may have less reactivity with the metal anode 212 than the flowable form of the electrolyte 232 has with the metal anode 212; (ii) the liquid 234 may be substantially immiscible with the flowable form of the electrolyte 232; and (iii) the liquid 234 may be less conductive than the flowable form of the electrolyte 232. The liquid 234 may also, or instead, have a different density than the flowable form of the electrolyte 232 under normal operating conditions of the metal-air battery 210 (e.g., normal operating temperatures and pressures). The liquid 234 may, further or instead, include an oil (e.g., one or more of mineral oil and a silicone oil).

Because the liquid 234 may be substantially immiscible with the flowable form of the electrolyte 232, and/or have a different density than the flowable form of the electrolyte 232, the liquid 234 and the flowable form of the electrolyte 232 may be substantially separate from one another within the first reservoir 238.

In the first state of operation for the metal-air battery system 120, the second reservoir 244 may contain a carrier 246 such as any carrier described herein (e.g., water). Further, in the first state of operation for the metal-air battery system 120, the gap 216 of the metal-air battery 210 may be substantially empty, or may otherwise be substantially devoid of any substance or material that can cause substantial reactions with the metallic anode 212, or substantial reactions between the metallic anode 212 and the air cathode 214, where substantial reactions in this context include reactions that could appreciably lessen the lifespan of the metal-air battery 210, cause a measurable capacity fade, cause significant corrosion, or combinations thereof.

FIG. 4 is a schematic representation of the metal-air battery system 120 in a second state of operation. The second state of operation for the metal-air battery system 120 may include an initial activation of the metal-air battery 210, or a state in preparation of an initial activation of the metal-air battery 210.

In the second state of operation, the second pump 248 may be actuated to move the carrier 246 from the second reservoir 244 (as shown by the first arrow 460 in FIG. 4) to the first reservoir 238 (as shown by the second arrow 462 in FIG. 4) for mixing with the flowable form of the electrolyte 232. In certain aspects, the flowable form of the electrolyte 232 shown in FIG. 4 may have an increased flowability relative to the flowable form of the electrolyte 232 shown in the first state of operation in FIG. 3. For example, the flowable form of the electrolyte 232 in the first state of operation shown in FIG. 3 may include a crystallized electrolyte, and the carrier 246 may include water, such that the flowable form of the electrolyte 232 in the second state of operation shown in FIG. 4 includes an aqueous solution of the electrolyte (e.g., where at least a portion of the crystallized electrolyte is dissolved in the water or is otherwise carried by the water to form the aqueous solution of the electrolyte). In another example, the flowable form of the electrolyte 232 in the first state of operation shown in FIG. 3 may include a powder, and the carrier 246 may include a gel, such that the flowable form of the electrolyte 232 in the second state of operation shown in FIG. 4 includes a gel containing the powdered electrolyte. Thus, in general, the flowable form of the electrolyte 232 in the first state of operation shown in FIG. 3 may include a first viscosity, and the flowable form of the electrolyte 232 in the second state of operation shown in FIG. 4 may include a second viscosity, where the first viscosity is greater than the second viscosity.

In the second state of operation, the flowable form of the electrolyte 232 and the liquid 234 may be disposed within the first reservoir 238. The properties of the liquid 234 and the flowable form of the electrolyte 232 may allow for the flowable form of the electrolyte 232 to be disposed in a location of the first reservoir 238 separated from the liquid 234 such that the flowable form of the electrolyte 232 and can travel into the gap 216 upon the metal-air battery 210 being placed in an activated state, such as the state of operation shown in FIG. 5.

FIG. 5 is a schematic representation of the metal-air battery system 120 in a third state of operation. The third state of operation for the metal-air battery system 120 may be a state of operation that places the metal-air battery 210 in an activated state, where the flowable form of the electrolyte 232 is moved (e.g., pumped) from the first reservoir 238 (as shown by the first arrow 560 in FIG. 5) into the gap 216 of the metal-air battery 210 (as shown by the second arrow 562 in FIG. 5), e.g., using the first pump 236. In certain aspects, the state of operation shown in FIG. 5 represents an initial activation of the metal-air battery 210 (e.g., where the flowable form of the electrolyte 232 is previously predisposed in the first reservoir 238 without any mixing with a carrier 246).

In the third state of operation, the first pump 236 may be actuated to move the flowable form of the electrolyte 232 from the first reservoir 238 into the gap 216 of the metal-air battery 210, which may be devoid of another substance prior to actuation. Alternatively, the gap 216 may contain the liquid 234 prior to such actuation, where movement of the flowable form of the electrolyte 232 into the gap 216 displaces the liquid 234 from the gap 216 and into the first reservoir 238.

Movement of the flowable form of the electrolyte 232 into the gap 216 may cause a reaction to occur between one or more of the metallic anode 212, the air cathode 214, and the flowable form of the electrolyte 232, such that electrical power is generated by the metal-air battery 210.

FIG. 6 is a schematic representation of the metal-air battery system 120 in a fourth state of operation. The fourth state of operation for the metal-air battery system 120 may be an activated state for the metal-air battery 210, where the flowable form of the electrolyte 232 is disposed within the gap 216 of the metal-air battery 210 and the liquid 234 is disposed in the first reservoir 238. In the activated state, the flowable form of the electrolyte 232 may be maintained in the gap 216 to generate electrical power (e.g., where the air cathode 214 allows for air to enter the gap 216 to cause a reaction with a reactant that travels through the conductive flowable form of the electrolyte 232 to react with the metallic anode 212 thereby generating electrons that can perform useful work). The electrons may be transferred to an electrical load 202.

FIG. 7 is a schematic representation of the metal-air battery system 120 in a fifth state of operation. The fifth state of operation for the metal-air battery system 120 may be a state of operation that places the metal-air battery 210 in a deactivated state, where the liquid 234 is moved (e.g., pumped) from the first reservoir 238 (as shown by the first arrow 760 in FIG. 7) into the gap 216 of the metal-air battery 210 (as shown by the second arrow 762 in FIG. 7), for example, using the first pump 736. Movement of the liquid 234 into the gap 216 may substantially displace the flowable form of the electrolyte 232 from the gap 216 (as shown by the third arrow 764 in FIG. 7). The displaced flowable form of the electrolyte 232 may travel into the first reservoir 238 (as shown by the fourth arrow 766 in FIG. 7), for example, taking the place of the liquid 234 that once occupied the first reservoir 238. The substantial displacement of the flowable form of the electrolyte 232 from the gap 216 may signifi-cantly limit a reactant of a reaction that occurs in the gap 216 in the presence of a higher volume of the flowable form of the electrolyte 232.

FIG. 8 is a schematic representation of the metal-air battery system 120 in a sixth state of operation. The sixth state of operation for the metal-air battery system 120 may include a deactivated state for the metal-air battery 210, where the liquid 234 is disposed within the gap 216 of the metal-air battery 210 and the flowable form of the electrolyte 232 is disposed in the first reservoir 238. In the deactivated state, the liquid 234 may be maintained in the gap 216 to substantially retard one or more of reactions occurring in the metal-air battery 210, the generation of electrical power by the metal-air battery 210, the corrosion of the metallic anode 212 or another component of the metal-air battery 210, and a capacity fade of the metal-air battery 210.

Although shown as separate states of operation, it will be understood that one or more of the states of operation described with reference to FIGS. 3-8 may be combined, supplemented, or omitted. For example, an initial state of operation for the metal-air battery may include a state where the liquid 234 is disposed in the gap 216 and the flowable form of the electrolyte 232 is disposed in the first reservoir 238 (e.g., as shown in FIG. 8). By way of another example, the second reservoir 244 may be eliminated from the metal-air battery system 120. Other states of operation are also, or instead, possible.

Figure 9:
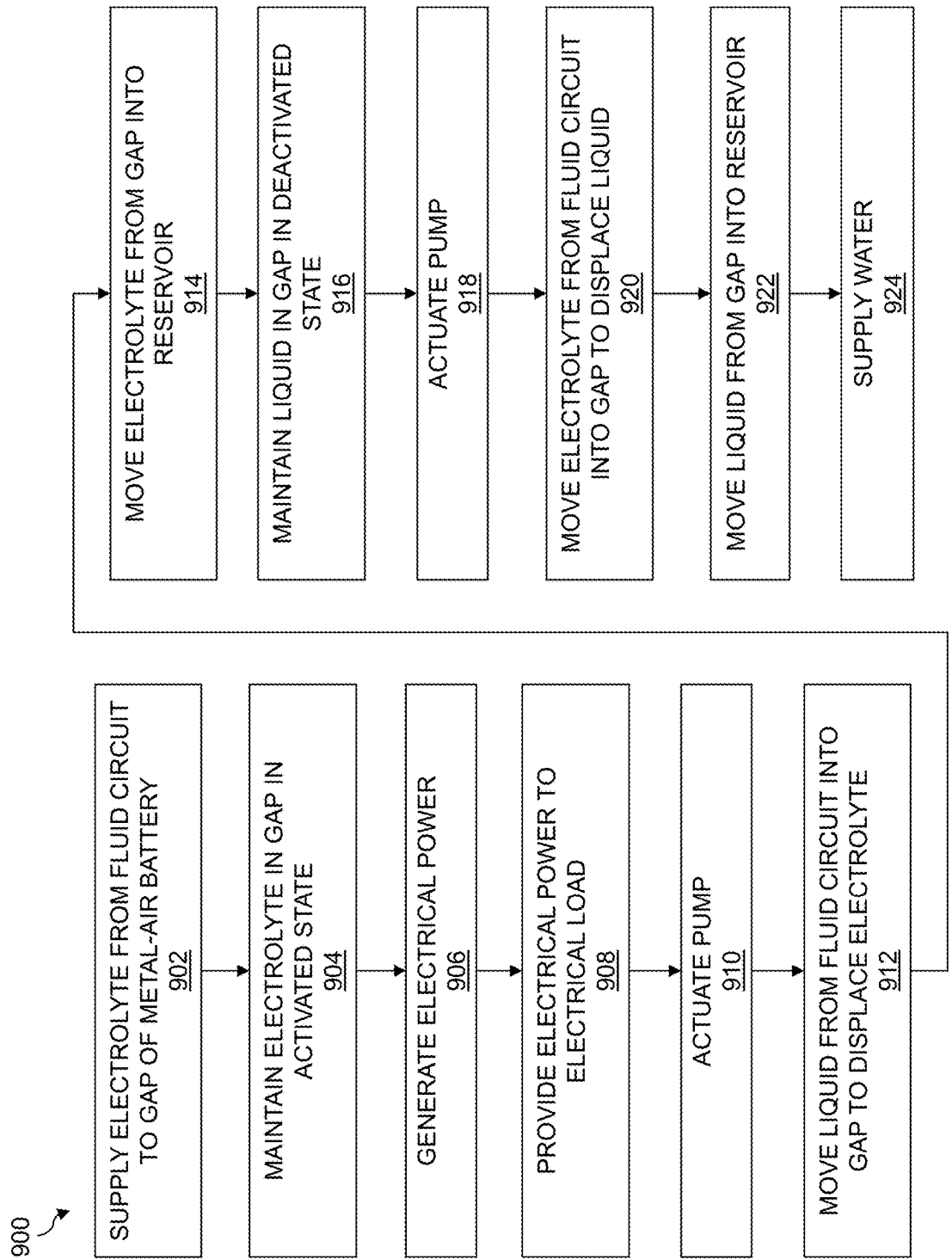
FIG. 9 is a flow chart of an exemplary method of operating a metal-air battery system.

FIG. 9 is a flow chart of a method of operating a metal-air battery. The method 900 may include the operation, use, or implementation of one or more of the metal-air batteries described herein, and one or more of the systems described herein. For example, the method 900 may be used to mitigate corrosion in a metal-air battery.

As shown in step 902, the method 900 may include supplying a flowable form of an electrolyte from a fluid circuit to a gap defined between a metallic anode and an air cathode of a metal-air battery. The flowable form of the electrolyte may include one or more of sodium hydroxide and potassium hydroxide. The flowable form of the electrolyte may also, or instead, include one or more of an aqueous solution of the electrolyte, a gel including the electrolyte, and a powder.

In certain implementations, the metallic anode includes aluminum (e.g., such that the metal-air battery is an aluminum-air battery). It will be understood that other types of batteries may also, or instead, be operated using the method 900. For example, zinc-air batteries (e.g., where the metallic anode includes zinc) and metal-seawater batteries (e.g., where the air cathode is a seawater cathode) may further, or instead, be operated using the method 900.

As shown in step 904, the method 900 may include maintaining the flowable form of the electrolyte in the gap when the metal-air battery is in an activated state. As described herein, maintaining the flowable form of the electrolyte in the gap may enable predetermined reactions to occur between the metallic anode, the air cathode, and the electrolyte, to generate electrical output from the metal-air battery.

As shown in step 906, the method 900 may include, with the flowable form of the electrolyte disposed in the gap between the metallic anode and the air cathode, generating electrical power at the metal-air battery.

As shown in step 908, the method 900 may include providing electrical power generated at the metal-air battery to an electrical load (e.g., a lithium-ion battery, where the metal-air battery charges the lithium-ion battery).

As shown in step 910, the method 900 may include actuating a pump in fluid communication with the fluid circuit and the gap. The pump may be disposed between the gap and a reservoir holding a liquid. The liquid may be one or more of: (i) less reactive with the metallic anode than the flowable form of the electrolyte is with the metallic anode; (ii) substantially immiscible with the flowable form of the electrolyte; or (iii) less conductive than the flowable form of the electrolyte. The liquid may also, or instead, have a different density than the flowable form of the electrolyte at standard operating conditions for the metal-air battery. The liquid may include an oil in a flowable form at standard operating conditions of the metal-air battery (e.g., one or more of mineral oil or a silicone oil).

As shown in step 912, the method 900 may include selectively moving the liquid from the fluid circuit into the gap. The movement of the liquid into the gap may displace the flowable form of the electrolyte from the gap to the fluid circuit. Because the liquid may be less reactive with the metallic anode than the flowable form of the electrolyte is with the metallic anode, movement of the liquid into the gap may substantially limit a reactant of a reaction occurring at the metallic anode in the presence of the flowable form of the electrolyte.

As shown in step 914, the method 900 may include moving the displaced flowable form of the electrolyte from the gap into a first reservoir included in the fluid circuit. As discussed herein, the movement of one or more of the electrolyte and the fluid from the gap into a first reservoir may occur because of displacement by the other one of the electrolyte and the fluid within the gap. However, the movement of one or more of the electrolyte and the fluid from the gap into a first reservoir may also, or instead, be assisted (e.g., via one or more pumps).

As shown in step 916, the method 900 may include maintaining the liquid in the gap when the metal-air battery is in a deactivated state. The liquid being maintained in the gap may substantially limit chemical reactions occurring in the gap, which may facilitate preserving battery life and/or lessening capacity fade of the metal-air battery. For example, as stated herein, the chemical reactivity between the liquid and the metallic anode may be less than chemical reactivity between the metallic electrode and the electrolyte. Thus, if the electrolyte is substantially displaced by the liquid in the gap of the metal-air battery in a deactivated state, fewer chemical reactions may be occurring in the gap. In turn, fewer chemical reactions occurring in the gap in the deactivated state may facilitate preserving the metallic anode and/or mitigating corrosion of the metallic anode.

As shown in step 918, the method 900 may include actuating a pump in fluid communication with the fluid circuit and the gap. The pump may be disposed between the gap and a reservoir holding the flowable form of the electrolyte. For example, as shown in step 914 above, the flowable form of the electrolyte displaced from the gap may be moved into a first reservoir included in the fluid circuit, and the pump may be disposed between the gap and the first reservoir.

As shown in step 920, the method 900 may include selectively moving the flowable form of the electrolyte into the gap (e.g., using the pump as discussed above with respect to step 918). Movement of the flowable form of the electrolyte into the gap may displace the liquid from the gap to the fluid circuit.

As shown in step 922, the method 900 may include moving the liquid displaced from the gap to the first reservoir. Thus, for example, when the flowable form of the electrolyte is selectively moved from the first reservoir into the gap, the movement of the flowable form of the electrolyte into the gap may displace the liquid from the gap to the first reservoir.

In certain implementations, at least steps 910-922 of the method 900 may be repeated over the lifespan of a metal-air battery, as the metal-air battery switches between an activated state and a deactivated state. Thus, the method 900 may generally include actuating a pump in fluid communication with the first reservoir and the gap to selectively move one of the liquid and the flowable form of the electrolyte from the first reservoir into the gap to displace the other one of the liquid and the flowable form of the electrolyte in the gap, where the other one of the liquid and the flowable form of the electrolyte received by the first reservoir upon displacement.

As shown in step 924, the method 900 may include supplying water to the fluid circuit such that the flowable form of the electrolyte includes an aqueous solution of the electrolyte. Water may be supplied from a second reservoir in fluid communication with the first reservoir, where the first reservoir includes the flowable form of the electrolyte. This step 924 may be an initial step for activating the metal-air battery. By way of example, before activation, the metal-air battery may be in fluid communication with a first reservoir including both the liquid and the flowable form of the electrolyte. Upon activation of the metal-air battery, water may be supplied into the first reservoir thereby creating (or adding to) an aqueous solution of the electrolyte. The aqueous solution of the electrolyte may then be supplied into the gap of the metal-air battery for generating electrical power through reactions occurring between the metallic anode, the air cathode, and the aqueous solution of the electrolyte. Additionally, or alternatively, supplying water (or another carrier or solution) to the fluid circuit (or the metal-air battery) may occur periodically or as-needed to replenish the flowable form of the electrolyte. Similarly, the method 900 may include supplying more of the liquid to the fluid circuit (or the metal-air battery) to replenish the liquid.

An example of operation of a system such as those described herein may include changing the state of a metal-air battery from an activated state to a deactivated state by pumping liquid (e.g., oil) into the gap of the metal-air battery from one or more locations to displace a flowable form of an electrolyte (e.g., an aqueous solution of electrolyte) from the gap. This process may take about 30 seconds. The metallic anode of the metal-air battery may include imperfections such as pits or indentations, which may collect electrolytes therein, even when the liquid is moved into the gap. These "trapped" electrolytes may cause corrosion of the metallic anode. However, because a majority of the electrolyte may be displaced, corrosion of the metallic anode may occur at a fraction of the rate of other corrosion mitigation techniques.

In certain implementations, techniques described herein do not leave the metallic anode of a metal-air battery completely dry when the metal-air battery is deactivated. Instead, the fluid that substantially displaces the flowable form of an electrolyte (where the fluid may include an oil as described herein) may remain in any interelectrode gaps of the metal-air battery. A potential benefit of techniques described herein is that the added mass and volume to a metal-air battery for the displacing liquid may be minimal compared to other mechanical mitigation techniques. This could result in increases to pack-level gravimetric and volumetric energy densities, even over some Li-ion battery packs. Also, while Li-ion battery packs may have relatively high volumetric energy densities for batteries, Al-air battery packs may have a distinct gravimetric energy density advantage (e.g., where a decreased battery weight in an electric vehicle allows for the use of less battery because less mass is to be moved). Moreover, using a lighter battery may result in a lower cost vehicle, which can improve the overall costs of BEVs. Lower BEV cost and the mitigation or elimination of range anxiety using Al-air range extenders could increase BEV market penetration, which can lower greenhouse gas emissions.

Techniques described herein may be particularly advantageous for metal-air batteries that are turned on and off in relatively short durations of time. For applications where a metal-air battery is switched on and off in relatively short durations of time, an aqueous solution of electrolyte may be preferred over a gel because of clogging issues that can occur.

While displacement of a flowable form of an electrolyte has been described as including moving a liquid (such as an oil) into contact with each of the metallic electrode and the air electrode, it should be appreciated that other techniques for liquid displacement to interrupt operation of a battery, such as a metal-air battery, are additionally or alternatively possible. For example, a first flowable medium (e.g., a flowable form of an electrolyte) may be displaced by a second flowable medium (e.g., an oil) along a first electrode while a second electrode remains in contact with the first flowable medium. In instances in which the first flowable medium degrades the first electrode, displacing the first flowable medium with the second flowable medium in contact with the first electrode may reduce degradation of the first electrode in an open-circuit state of the battery, according to any one or more of the mechanisms described above. Further, or instead, in instances in which the second flowable medium degrades the second electrode, the first flowable medium may remain in contact with the second electrode to reduce the likelihood of certain degradation mechanisms (e.g., fouling through electrode evaporation on the second electrode in instances in which the second electrode is an air electrode) at the second electrode in the open-circuit state of the battery. Thus, as described in greater detail below, the first flowable medium and the second flowable medium may be moved relative to one another and relative to the first electrode and the second electrode as may be advantageous to address different long-term open-circuit degradation considerations associated with the first electrode and the second electrode.

As used herein, the term "flowable medium" shall be understood to include any one or more of the various different flowable media described herein, unless a more specific description is set forth in a particular context. Thus, for example, the term flowable medium may include one or more of a liquid, a gel, a flowable powder, or a gas.

Figure 10A:
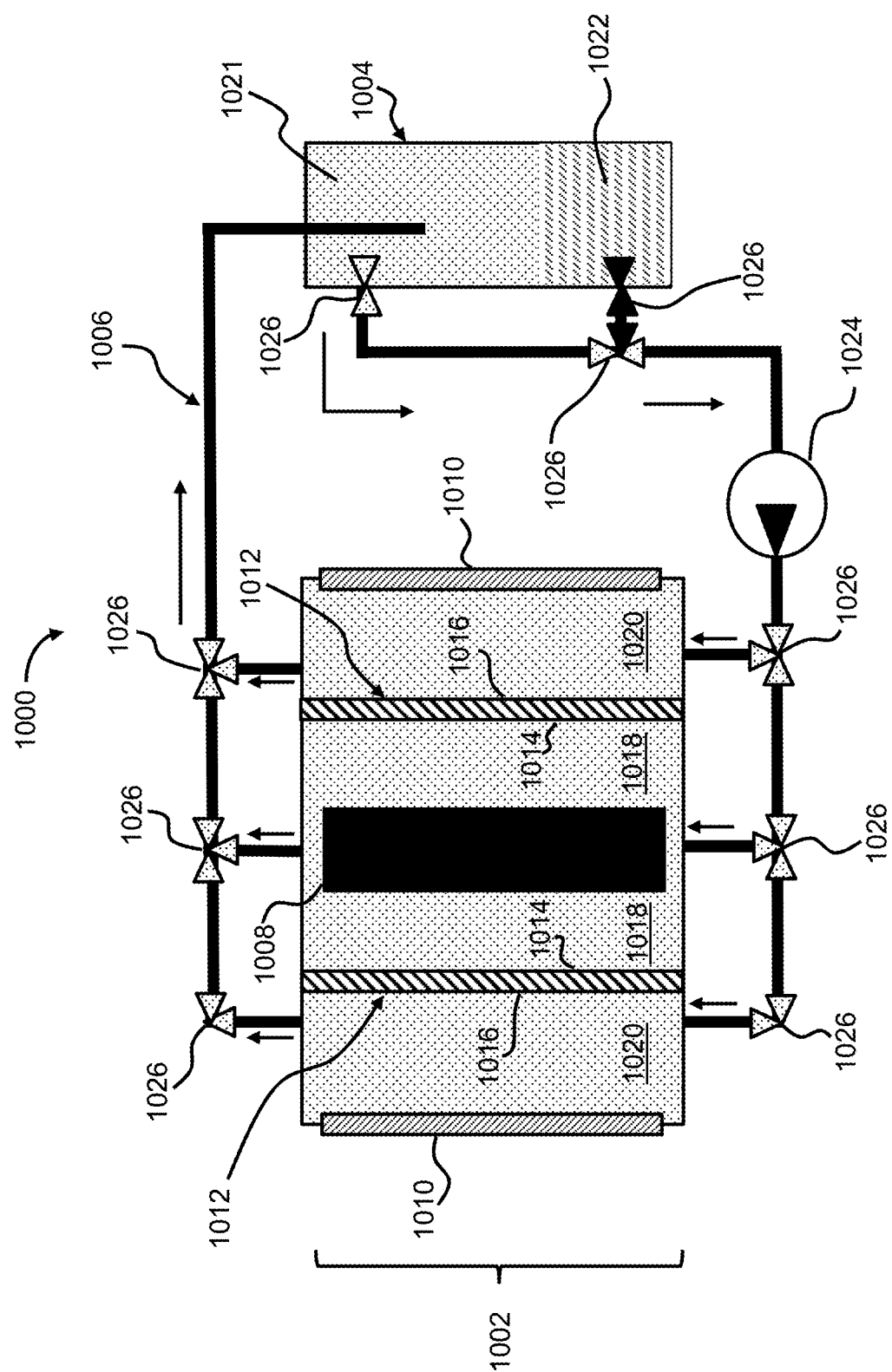
FIG. 10A is a schematic representation of a battery system including a membrane, with a battery in an activated state.
Figure 10B:
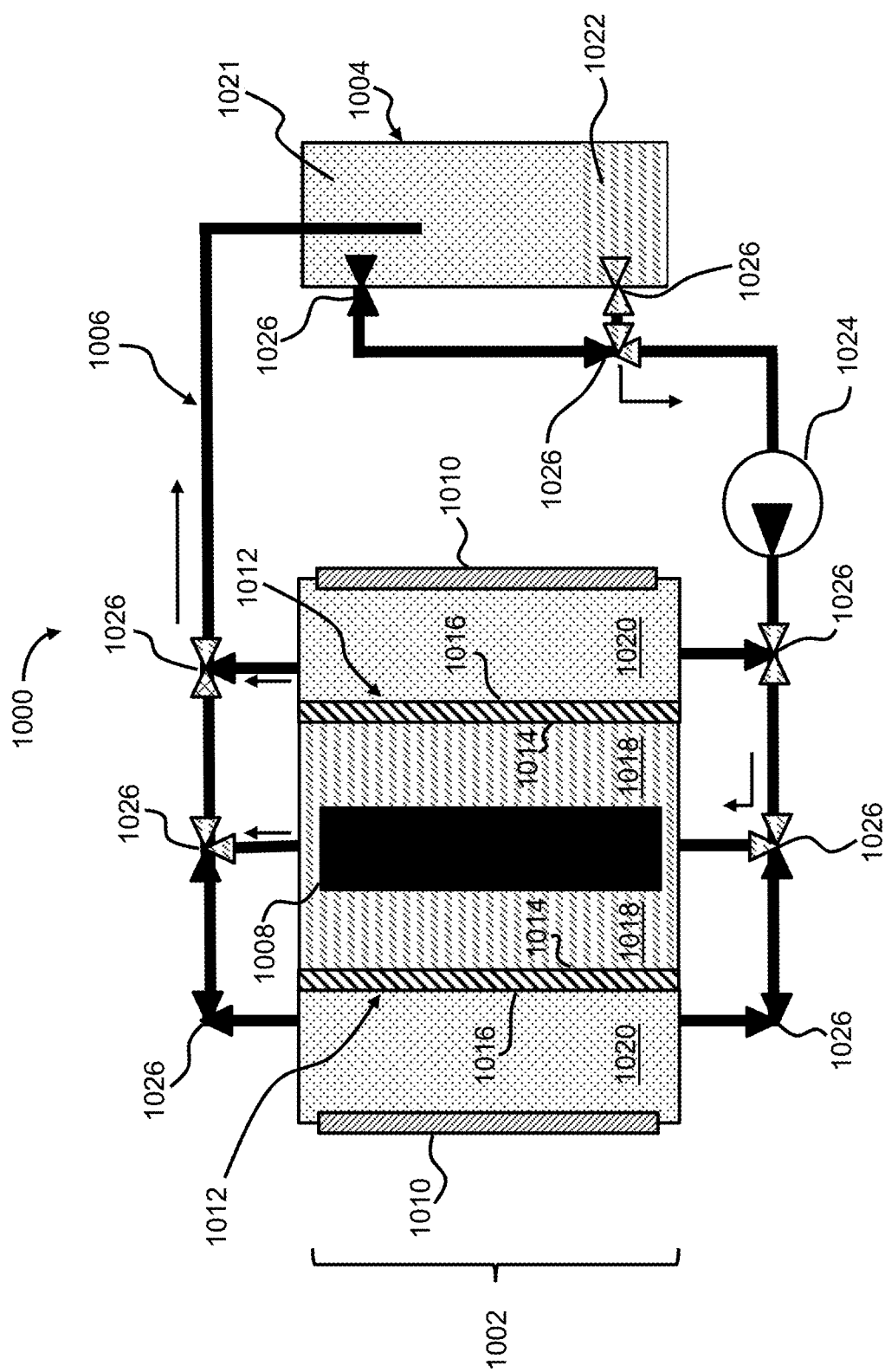
FIG. 10B is a schematic representation of the battery system of FIG. 10A, with a battery in a deactivated state.

Referring now to FIGS. 10A and 10B, a battery system 1000 may include a battery 1002 in fluid communication with a reservoir 1004 via a fluid circuit 1006. The battery 1002 may include a first electrode 1008, a second electrode 1010, and a membrane 1012. The membrane 1012 may have a first side 1014 and a second side 1016 opposite the first side 1014. The membrane 1012 may be disposed between the first electrode 1008 and the second electrode 1010 such that the first electrode 1008 and the first side 1014 of the membrane 1012 define a first gap 1018, and the second electrode 1010 and the second side 1016 of the membrane 1012 define a second gap 1020. For the sake of clarity and efficiency of explanation, the description that follows describes the use of the battery system 1000 in the context of a metal-air battery system, which may include any one or more of the various different metal-air battery systems described above. It should be appreciated, however, that the battery system 1000 may be used to mitigate corrosion of one or more electrodes of any of various different types of batteries (e.g., lead acid batteries), unless otherwise specified or made clear from the context.

The fluid circuit 1006 may include a first flowable medium 1021 and a second flowable medium 1022 moveable along the fluid circuit 1006 to transition the battery system 1000 between an activated state (FIG. 10A) and a deactivated state (FIG. 10B). In the activated state of the battery system 1000, the first flowable medium 1021 may be on either side of the membrane 1012, between the first electrode 1008 and the second electrode 1010, such that an electrolyte in the first flowable medium 1021 may flow from the second electrode 1010 to the first electrode 108, via the membrane 1012, to produce power. In use, the fluid circuit 1006 may be activated to transition from the activated state of the battery system 1000 to the deactivated state (also referred to herein as an open-circuit) of the battery system 1000 and vice versa (e.g., through multiple cycles of transition from the activated state to the deactivated state and back to the activated state). For example, as described in greater detail below, the fluid circuit 1006 may be operable to displace the first flowable medium 1021 with a second flowable medium 1022 along the first gap 1018 while the first flowable medium 1021 remains in contact with the second electrode in the second gap 1020. As also described in greater detail below, by allowing selective displacement of the first flowable medium 1021 on the first electrode 1008 while keeping the second electrode 1010 in contact with the first flowable medium 1021, the membrane 1012 may mitigate respective different degradation mechanisms associated with the first electrode 1008 and the second electrode 1010 and, thus, in turn, may facilitate achieving prolonged pauses while maintaining high power and energy density of the battery system 1000.

In general, the membrane 1012 may be any one or more of various different types of materials compatible with operation of the first electrode 1008 and the second electrode 1010 in the activated state of the battery 1002 and further compatible with the first flowable medium 1021 and the second flowable medium 1022 in the deactivated state of the battery 1002. For example, the membrane 1012 may be permeable from the first gap 1018 to the second gap 1020 such that electrolytes in the first flowable medium 1021 may move through the membrane 1012 as part of operation of the battery 1002 in the activated state.

Further, or instead, the membrane may be formed of one or more materials suitable for withstanding multiple transitions between the first flowable medium 1021 and the second flowable medium 1022 in the first gap 1018. For example, at least the first side 1014 of the membrane 1012 along the first gap 1018 may be formed of a material that resists degradation in the presence of the second flowable medium 1022 in the first gap 1018 when the battery 1002 is in a deactivated state (e.g., before use and/or between use cycles). As a more specific example, at least the first side 1014 of the membrane 1012 may include a material along the first gap 1018 that is oleophobic in the presence of water (also referred to herein as an underwater oleophobic material and described in greater detail below). Such material may be advantageous, for example, in instances in which the first flowable medium 1021 includes an aqueous electrolyte and the second flowable medium 1022 includes an oil. That is, the preference of the membrane 1012 for water along the first gap 1018 may reduce the likelihood that oil of the second flowable medium 1022 (used to protect the first electrode 1008 in the deactivated state of the battery 1002) will inadvertently remain on the first side 1014 of the membrane 1012 to interfere with the flow of the aqueous electrolyte of the first flowable medium 1021 during operation of the battery 1002 in the activated state.

In general, the first electrode 1008 may be any one or more of various different types of electrodes suitable for use in a battery. For example, the first electrode 1008 may be a metallic anode, including any of the various different metallic anodes described herein. Thus, by way of further example, the first electrode 1008 may be a metallic anode including one or more of iron, zinc, magnesium, aluminum, or lithium.

The second electrode 1010 may be any of various different types of electrodes compatible with the first electrode 1008 and the first flowable medium 1021 to generate electrical power (e.g., where a reactant may travel from the second electrode 1010 to the first electrode via the first flowable medium 1021 to generate electrons that can perform useful work). Thus, for example, the second electrode may be an air cathode permeable to oxygen, such as any one or more of the various different air cathodes described herein. As a more specific example, in instances in which the second electrode 1010 is an air cathode, the second electrode 1010 may include a reactive layer of carbon having one or more of a nickel-grid current collector, a catalyst (e.g., cobalt), and a porous hydrophobic polytetrafluoroethylene (PTFE) film that may prevent leakage of the first flowable medium 1021.

The fluid circuit 1006 may include any of various different components in any of various different arrangements suitable for displacing one of the first flowable medium 1021 or the second flowable medium 1022 with the other one of the first flowable medium 1021 or the second flowable medium 1022 in the first gap 1018 while maintaining contact between the first flowable medium 1021 and the second electrode 1010 as the displacement of fluids takes place in the first gap 1018. As an example, the fluid circuit 1006 may include at least one instance of the actuator 1024 actuatable to displace one of the first flowable medium 1021 or the second flowable medium 1022 with the other one of the first flowable medium 1021 or the second flowable medium 1022 along the first gap 1018, as suitable for achieving a desired state of the battery 1002—that is, to activate or deactivate the battery 1002.

In general, the actuator 1024 may be actuatable using any one or more of various different activation mechanisms including electrical activation, hydraulic activation, chemical activation, mechanical activation, or a combination thereof. The actuator 1024 may be actuatable manually, such as upon initial installation. Further, or instead, the actuator 1024 may be actuated based on a state-of-charge of a device receiving power from the battery 1002 (e.g., the rechargeable battery 110 in FIG. 1).

In certain implementations, the actuator 1024 may include a pump, such as any one or more of various different positive displacement pumps, that may be cycled on and off or otherwise controlled in accordance with achieving a desired state of the battery 1002. The pump may be sized to produce a pressure compatible with the membrane 1012 such that, at pressures produced in the first gap 1018 by the pump, the pores of the membrane 1012 suppress passage of the second flowable medium 1022 through the membrane 1012 in the deactivated state of the battery 1002 while minimizing ionic resistance across the membrane 1012 in the activated state of the battery 1002. As should be understood, such compatibility of pore sizes of the membrane 1012 with pumping pressure may be useful, for example, for reducing the likelihood of migration of the second flowable medium 1022 through the membrane 1012 and into inadvertent contact with the second electrode 1010.

In general, the fluid circuit 1006 may be a closed system such that the duration of activation of the actuator 1024 corresponds to position of the first flowable medium 1021 and the second flowable medium 1022 relative to the first gap 1018. Additionally, or alternatively, the presence of the first flowable medium 1021 in the first gap 1018 may be verified based on the production of electrical power in the battery 1002. Similarly, the presence of the second flowable medium 1022 in the first gap 1018 may be verified based on the absence of production of electrical power in the battery 1002.

In some implementations, the fluid circuit 1006 may include one or more valves 1026 actuatable in coordination with one another and with the actuator 1024 to direct the first flowable medium 1021 and the second flowable medium 1022 through the fluid circuit 1006 as necessary to achieve a desired activated state or deactivated state of the battery 1002. The one or more valves 1026 may be, for example, two-way valves, three-way valves, or any combination thereof, such as may be required based on the arrangement of the fluid circuit 1006. In certain implementations, the one or more valves 1026 may be solenoid valves electronically controllable (e.g., based on a state of charge of the battery 1002).

In general, it should be appreciated that the first flowable medium 1021 and the second flowable medium 1022 may have certain properties suitable for mitigating long-term open circuit corrosion in the battery 1002 while also allowing for cycling of the battery 1002 between activated and deactivated states, as may be required. In certain instances, the first flowable medium 1021 and the second flowable medium 1022 may have similar properties, as may be compatible for use together in the fluid circuit 1006. As an example, the first flowable medium 1021 and the second flowable medium 1022 may each be incompressible fluids to facilitate being pumped through the fluid circuit 1006. In some instances, however, the first flowable medium 1021 and the second flowable medium 1022 may advantageously have one or more different physicochemical properties to accommodate the demands associated with the different states of the battery 1002. In the disclosure that follows, some examples of such differences in physicochemical properties are offered by way of example and not limitation.

In certain instances, the first flowable medium 1021 and the second flowable medium 1022 may have different electrical conductivities. More specifically, the first flowable medium 1021 may have a first electrical conductivity and the second flowable medium 1022 may have a second electrical conductivity, the second conductivity less than the first conductivity. For example, with the first flowable medium 1021 in the first gap 1018, the battery 1002 may produce electricity efficiently. Continuing with this example, with the second flowable medium 1022 in the first gap 1018, the battery 1002 may produce electricity less efficiently, if at all. The difference in electrical conductivity between the first flowable medium 1021 and the second flowable medium 1022 may be attributable, for example, to higher ionic concentration in the first flowable medium 1021 as compared to the second flowable medium 1022. Thus, for example, the movement of the second flowable medium 1022 to displace the first flowable medium 1021 in the first gap 1018 may transition the battery 1002 from an activated state (in which electricity is produced) to a deactivated state (in which little or no electricity is produced). Similarly, movement of the first flowable medium 1021 to displace the second flowable medium 1022 in the first gap 1018 may transition the battery 1002 from the deactivated state to the activated state.

While the first flowable medium 1021 and the second flowable medium 1022 may have different properties suitable for transitioning between an activated state and a deactivated state of the battery 1002, the second flowable medium 1022 may advantageously further have physicochemical properties suitable for mitigating degradation of the first electrode 1008 when the battery 1002 is in the deactivated state in which the second flowable medium 1022 is in the first gap 1018 defined by the first electrode 1008 and the first side 1014 of the membrane 1012. For example, the first electrode 1008 may be more chemically reactive with the first flowable medium 1021 than with the second flowable medium 1022. As used in this context, chemical reactivity may be considered a proxy for consumption of one or more components of the first electrode 1008. Thus, stated differently, one or more components of the first electrode 1008 may be consumed at a higher rate when in contact with the first flowable medium 1021 than when in contact with the second flowable medium 1022.

Having described physicochemical properties of the first flowable medium 1021 and the second flowable medium 1022 relative to the first electrode, attention will now be turned to physicochemical properties of the first flowable medium 1021 and the second flowable medium 1022 with respect to the first side 1014 of the membrane 1012 defining the first gap 1018. For example, because the second flowable medium 1022 may interfere with operation of the battery 1002 in the activated state, it is generally desirable to remove all, or substantially all, of the second flowable medium 1022 from the first gap 1018 when the first flowable medium 1021 is introduced into the first gap 1018. In particular, it may be useful to achieve effective removal of the second flowable medium 1022 from the first side 1014 of the membrane 1012 to mitigate degradation of performance of the membrane 1012 over time. For example, the first flowable medium 1021 may have a first wetting angle on the first side 1014 of the membrane 1012 defining a portion of the first gap 1018, and the second flowable medium 1022 may have a second wetting angle on the first side 1014 of the membrane 1012 defining the portion of the first gap 1018, with the second wetting angle greater than the first wetting angle. That is, the first flowable medium 1021 may be more wettable than the second flowable medium 1022 on the first side 1014 of the membrane 1012, such that the preferential wetting of first flowable medium 1021 on the first side 1014 of the membrane 1012 facilitates displacing the second flowable medium 1022 from the first side 1014 of the membrane 1012.

Returning to the example in which the first flowable medium 1021 includes an aqueous electrolyte and the second flowable medium 1022 includes an oil, a wetting angle of the aqueous electrolyte on the first side 1014 of the membrane 1012 may be less than a wetting angle of the oil on the first side 1014 of the membrane 1012. In instances in which the first side 1014 of the membrane 1012 exhibits such a difference in wetting angles, the first side 1014 of the membrane 1012 shall be understood to be underwater oleophobic in the context of the present disclosure. Underwater oleophobicity is discussed in greater with respect to the experimental results presented below.

In certain implementations, the first flowable medium 1021 and the second flowable medium 1022 may be in contact with one another at an interface in the fluid circuit 1006. Through such contact, movement of one of the first flowable medium 1021 or the second flowable medium 1022 may exert force directly on the other one of the first flowable medium 1021 or the second flowable medium 1022. Thus, for example, in instances in which the first flowable medium 1021 and the second flowable medium 1022 are incompressible, displacement of one flowable medium may result in corresponding displacement of the other flowable medium. This may be particularly useful for reliably moving the first flowable medium 1021 and the second flowable medium 1022 within the fluid circuit 1006 to achieve the appropriate positioning associated with the activated state or the deactivated state, as the case may be.

The first flowable medium 1021 and the second flowable medium 1022 may, in some instances, be substantially insoluble in one another. That is, returning to the example of the first flowable medium 1021 and the second flowable medium 1022 in contact one another at an interface, such insolubility may facilitate maintaining integrity of the interface such that the first flowable medium 1021 and the second flowable medium 1022 may be reliably positioned with respect to one another and with respect to at least the first gap 1018. Thus, continuing with this example, substantial insolubility may include any degree of solubility suitable for maintaining separation of the first flowable medium 1021 and the second flowable medium 1022 during the useful life of the battery system 1000. As an example, the first flowable medium 1021 may have a solubility of less than about $10^{-6}$ to 1, by volume, in the second flowable medium 1022.

Figure 11:
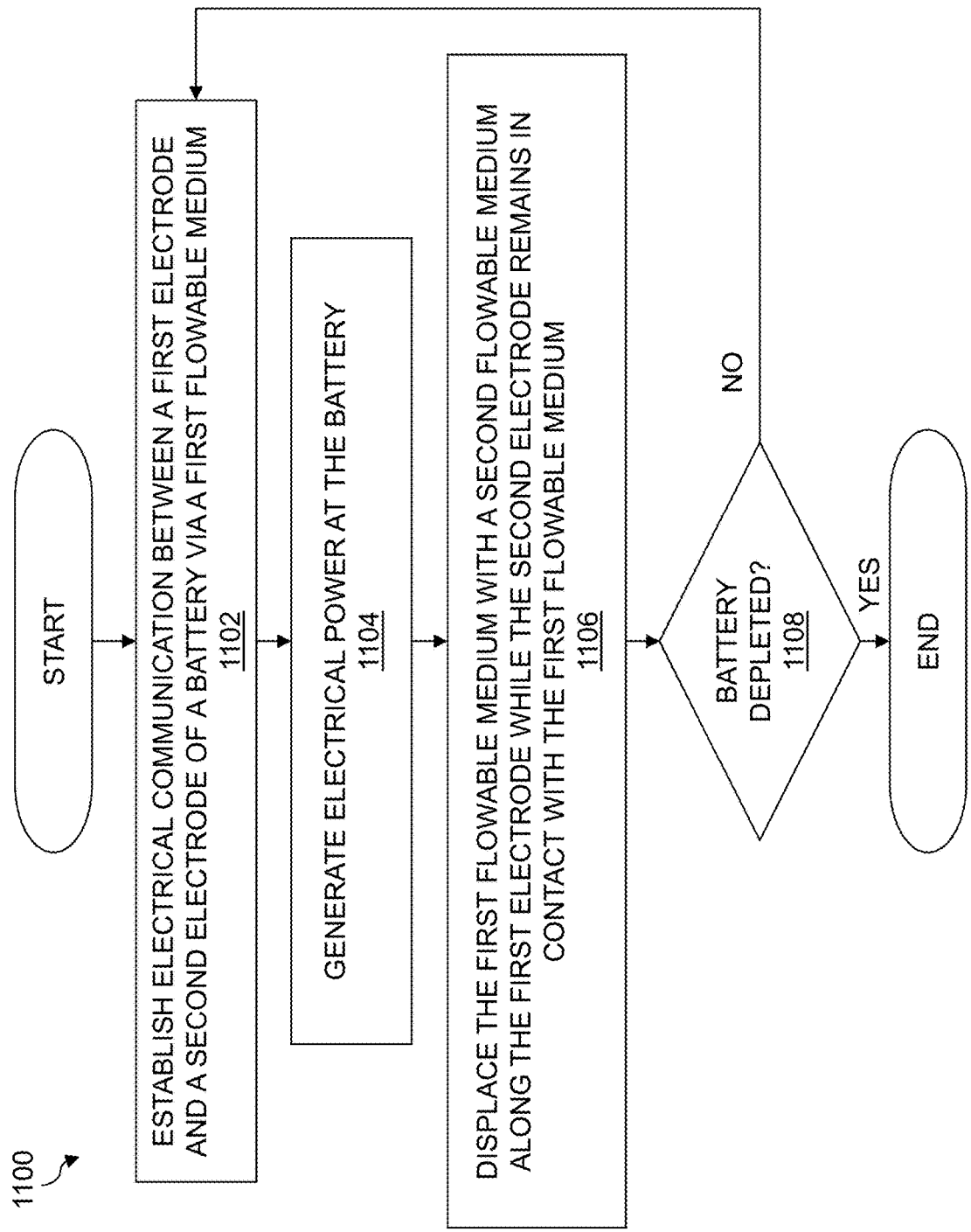
FIG. 11 is a flow chart of an exemplary method of operating a battery system.

FIG. 11 is a flowchart of an exemplary method 1100 of operating a battery system. Unless otherwise indicated or made clear from the context, the exemplary method 1100 may be carried out using any one or more of the devices and systems described herein. In particular, the exemplary method 1100 may be carried out using the battery system 1000 (FIGS. 10A and 10B).

As shown in step 1102, the exemplary method 1100 may include establishing electrical communication between a first electrode and a second electrode of a battery via a first flowable medium in contact with the first electrode and the second electrode. The first flowable medium may be any one or more of the first flowable media described herein and, thus, for example, may include an aqueous electrolyte flowable from the second electrode to the first electrode. In general, establishing electrical communication between the first electrode and the second electrode may include any one or more of various different forms of establishing electrical communication described herein. For example, establishing electrical communication between the first electrode and the second electrode may include adding a carrier (e.g., water) to a concentrated or anhydrous form of the first flowable medium, such as may be useful upon initial use of the battery system. Further, or instead, establishing electrical communication between the first electrode and the second electrode of the battery via the first flowable medium may include displacing a second flowable medium with the first flowable medium along the first electrode. More specifically, the first flowable medium may displace the second flowable medium along a gap defined by the first electrode and a membrane, and electrical communication between the first electrode and the second electrode may include flowing the first flowable medium through the membrane.

As shown in step 1104, the exemplary method 1100 may include, with the first electrode and the second electrode in electrical communication with one another via the first flowable medium, generating electrical power at the battery. As an example, the battery may be any one or more of the metal-air batteries described herein such that generating electrical power at the battery may proceed according one or more chemical reactions that consume the metal electrode of the metal-air battery over time. More generally, however, generating electrical power at the battery shall be understood to include allowing ions to flow from the second electrode to the first electrode. Thus, for example, in instances in which a membrane is disposed between the first electrode and the second electrode, the membrane may be sufficiently porous to allow the ions to flow from the second electrode to the first electrode.

As shown in step 1106, the exemplary method 1100 may include displacing the first flowable medium with the second flowable medium along the first electrode while the second electrode remains in contact with the first flowable medium, with the displacement of the first flowable medium with the second flowable medium along the first electrode interrupting electrical power generation at the battery. That is, the second flowable medium may be any one or more of the second flow media described herein and, thus, may be substantially non-conductive such that the presence of the second flowable medium between the first electrode and the second electrode interrupts electrical power generation at the battery. As used in this context, such interruption of electrical power generation at the battery includes at least a reduction in the total power generated at the battery and, in some cases, may include reducing the total power generated by the battery to zero.

In instances in which a membrane is disposed between the first electrode and the second electrode, displacing the first flowable medium with the second flowable medium may include moving the first flowable medium out of a first gap at least partially defined by a first side of a membrane and the first electrode. Continuing with this example, as the second flowable medium displaces the first flowable medium out of the first gap, the first flowable medium may remain in contact with the second electrode along a second gap at least partially defined by the second electrode and a second side of the membrane. It should be generally appreciated that maintaining contact between the first flowable medium and the second electrode may be useful mitigating one or more degradation mechanisms associated with the second electrode. For example, in certain instances, the sustained contact between the first flowable medium and the second electrode may reduce the likelihood that the second electrode may dry out prematurely.

In certain implementations, the first flowable medium may be an aqueous electrolyte, the second flowable medium may be an oil, and the first electrode and the first side of the membrane may each be underwater oleophobic. That is, the first electrode and the first side of the membrane may each be preferentially wettable with the first flowable medium as compared to the second flowable medium such that the first flowable medium may be particularly effective in displacing the second flowable medium from the respective surfaces of the first electrode and the first side of the membrane.

Further, or instead, the first flowable medium and the second flowable medium may be in contact with one another at an interface, and displacing the first flowable medium with the second flowable medium along the first electrode may include moving the interface through the first gap defined by the first electrode and the first side of the membrane. In use, the interface between the first flowable medium and the second flowable medium may be maintained, for example, by interface tension between the two media.

As shown in step 1108, any one or more of the steps 1102-1106 of the exemplary method 1100 may be repeated as necessary to cycle the battery between an activated state and a deactivated state, as necessary, until the battery is depleted (e.g., until a metal electrode of an air-metal battery is consumed).

The following experiments describe corrosion mitigation of an aluminum-air battery in accordance with the exemplary devices, systems, and methods described herein with respect to FIGS. 10A, 10B, and 11. That is, the aluminum-air battery used in the following experiments should be understood to have the general configuration of the battery shown in FIGS. 10A and 10B, unless otherwise specified or made clear from the context. Further, it is to be understood that these experiments and corresponding results are set forth by way of example only, and nothing in these examples shall be construed as a limitation on the overall scope of this disclosure.

In the battery used for these experiments, the positive electrode was an air electrode including carbon particles pressed on a metal mesh with a catalyst resulting in a reduction reaction. The negative electrode was a high-purity aluminum foil. The first flowable medium was 4 M sodium hydroxide (NaOH) with a corrosion inhibitor, 0.05 M sodium stannate ($Na_2SnO_3$). The membrane was an underwater-oleophobic separator, specifically a polytetrafluoroethylene (PTFE) membrane treated with an additive that made the membrane hydrophilic.

Figure 12:
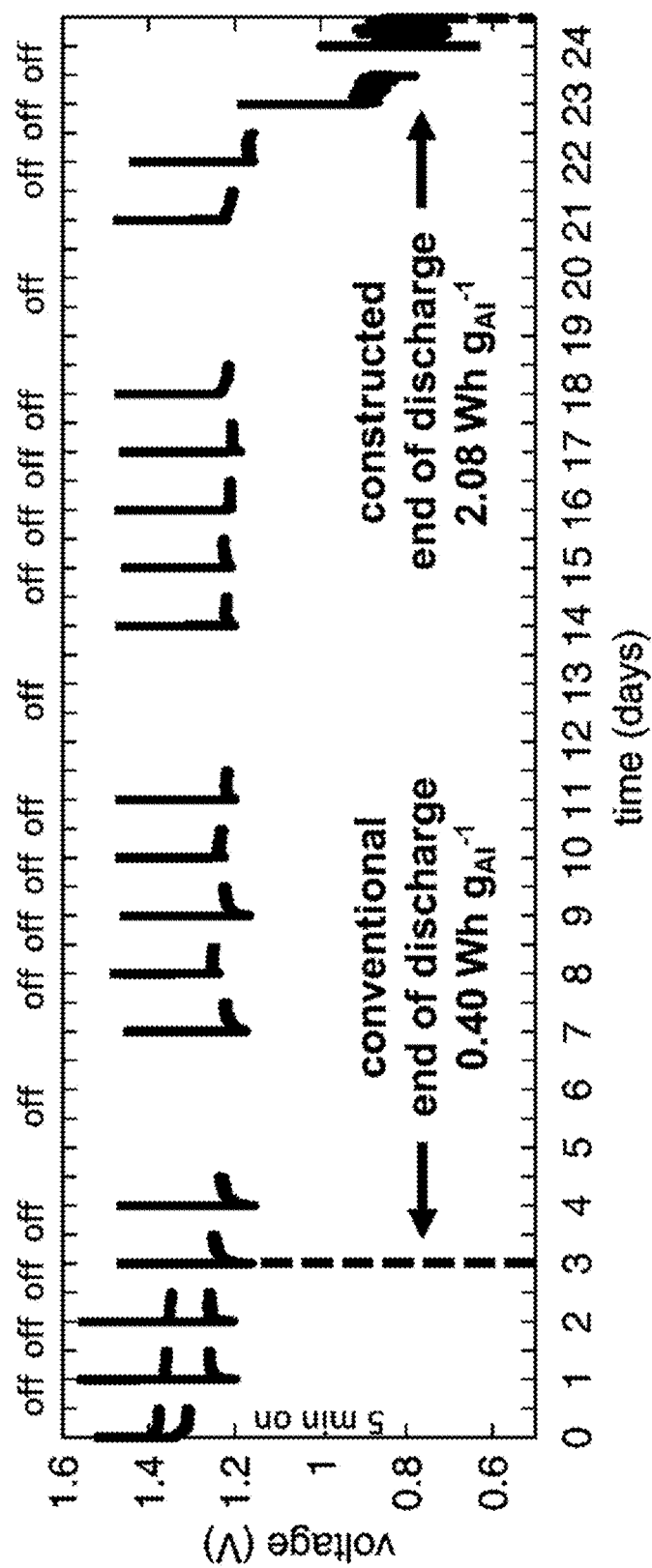
FIG. 12 is a graph of voltage as a function of time for on-off cycling of an Al-air battery (with only a first flowable medium and without a membrane) and an Al-air battery with the design of FIG. 10A.

FIG. 12 is a graph of voltage as a function of time for on-off cycling of a conventional Al-air battery (with only a first flowable medium and without a membrane) and an Al-air battery with the design of FIG. 10A. The useable energy density of the conventional flowing-electrolyte Al-air battery was increased 420% with the use of the battery configuration of FIG. 10A—using oil as a second flowable medium to displace the first flowable medium—by performing 24 days of on-off cycling. Current densities of 150 mA $cm_{geo}^{-2}$ were drawn for 5 min with 24 or 72-h pauses in between. During pauses for the conventional Al-air battery, the electrolyte remained in the interelectrode gap defined by the air electrode and the aluminum electrode. For the battery configuration of FIG. 10A, a perfluoropolyether (PFPE) oil was pumped into the first gap for 50 s at the start of each pause to displace the corrosive electrolyte from the first gap defined by the membrane and the aluminum electrode. Before each discharge, the electrolyte was pumped back into the first gap for 50 s. At the start of day 3, the conventional Al-air battery yielded a negative voltage when 150 mA $cm_{geo}^{-2}$ was drawn. The exposed aluminum electrode was dissolved through its thickness at that time, which was monitored through a transparent battery casing. The resulting energy density of the conventional Al-air battery was 0.40±0.07 Wh $g_{Al}^{-1}$. By comparison, the Al-air battery configured according to FIG. 10A, using the oil displacement system, lasted more than 24 days and yielded an energy density of 2.08±0.07 Wh $g_{Al}^{-1}$, an improvement of 420%.

The effectiveness of the oil as the second flowable medium in the Al-air battery configured according to FIG. 10A is believed to be at least partially attributable to selecting an oil that displays underwater oleophobicity on both the first electrode (the Al electrode in this case) and the membrane surface disposed between the aluminum anode and the air cathode. To test this principle, measurements were made of advancing and receding underwater contact angles of different types of oils on different membrane materials and on aluminum. In particular, measurements of such underwater contact angles were made of silicone oil on a hydrophilic Celgard® 5550 membrane (available from Celgard, LLC of Charlotte, N.C.) and on the aluminum electrode and of PFPE oil on a hydrophilic PTFE membrane and on the aluminum electrode. More specifically, advancing and receding contact angles of PFPE and silicone oil observed in an electrolyte solution were measured using the add-and-remove-volume method on a Ramé-Hart goniometer. New dispensing needles were used for every measurement. The dispensing needles were 5.08 cm in length, had gauges of 22, and were made of PTFE plastic. For upside-down contact angles, 0.38-mm "Bend-and-Stay" corrosion-resistant 316 steel wire was inserted into the plastic needles and bent to create a "J" shape. Photos were taken as the volume of the droplets were increased and decreased 5 times at rates of 0.25 μl min$^{-1}$. Temperature was controlled to 60.0° C. using a temperature-controlled chamber. The aluminum electrode was covered in electrolyte for one minute to simulate the surface state of the electrode after some discharge, and then contact angles were measured on its surface. For contact angles on the aluminum electrode, no sodium hydroxide and sodium stannate were used, and the temperature was kept at room temperature to stop hydrogen evolution during the contact angle experiments.

Both the silicone oil and the PFPE oil displayed underwater oleophobicity on the aluminum electrode. That is each oil was measured to have a contact angle of greater than 90° on the aluminum electrode. In particular, the contact angle of the silicone oil on the aluminum electrode was measured to be 145°, and the contact angle for the PFPE oil on the aluminum electrode was measured to be 160°. The contact angle of the PFPE oil on the PTFE was measured to be 140° and, thus, also displayed underwater oleophobicity. However, the silicone oil was observed to wet the a hydrophilic Celgard® 5550 membrane, having a contact angle of 60°.

The implications of such observations with respect to underwater oleophobicity were then tested by performing on-off cycling with Al-air cells using oil-membrane combinations used in the contact angle measurements described above. In particular, in one experiment, on-off cycling was performed with an Al-air cell including a hydrophilic Celgard® 5550 membrane disposed between an aluminum anode and an air cathode with silicone oil as the second flowable medium used to displace an aqueous electrolyte. This experiment represents a combination in which the second flowable medium does not demonstrate underwater oleophobicity on the membrane material. In another experiment, on-off cycling was performed with an Al-air cell including a PTFE membrane disposed between an aluminum ode and an air cathode with PFPE oil as the second flowable medium used to displace an aqueous electrolyte. This experiment represents a combination in which the second flowable medium demonstrates underwater oleophobicity on the membrane material. In each on-off cycling experiment, current densities of 150 mA cm$_{geo}^{-2}$ were drawn for 25 min with 1-h pauses, during which no current was drawn. At the start of each pause, the respective displacing oil was pumped into the respective battery for 50 s. Before the next discharge, electrolyte was pumped into the batteries for 50 s.

Figure 13A:
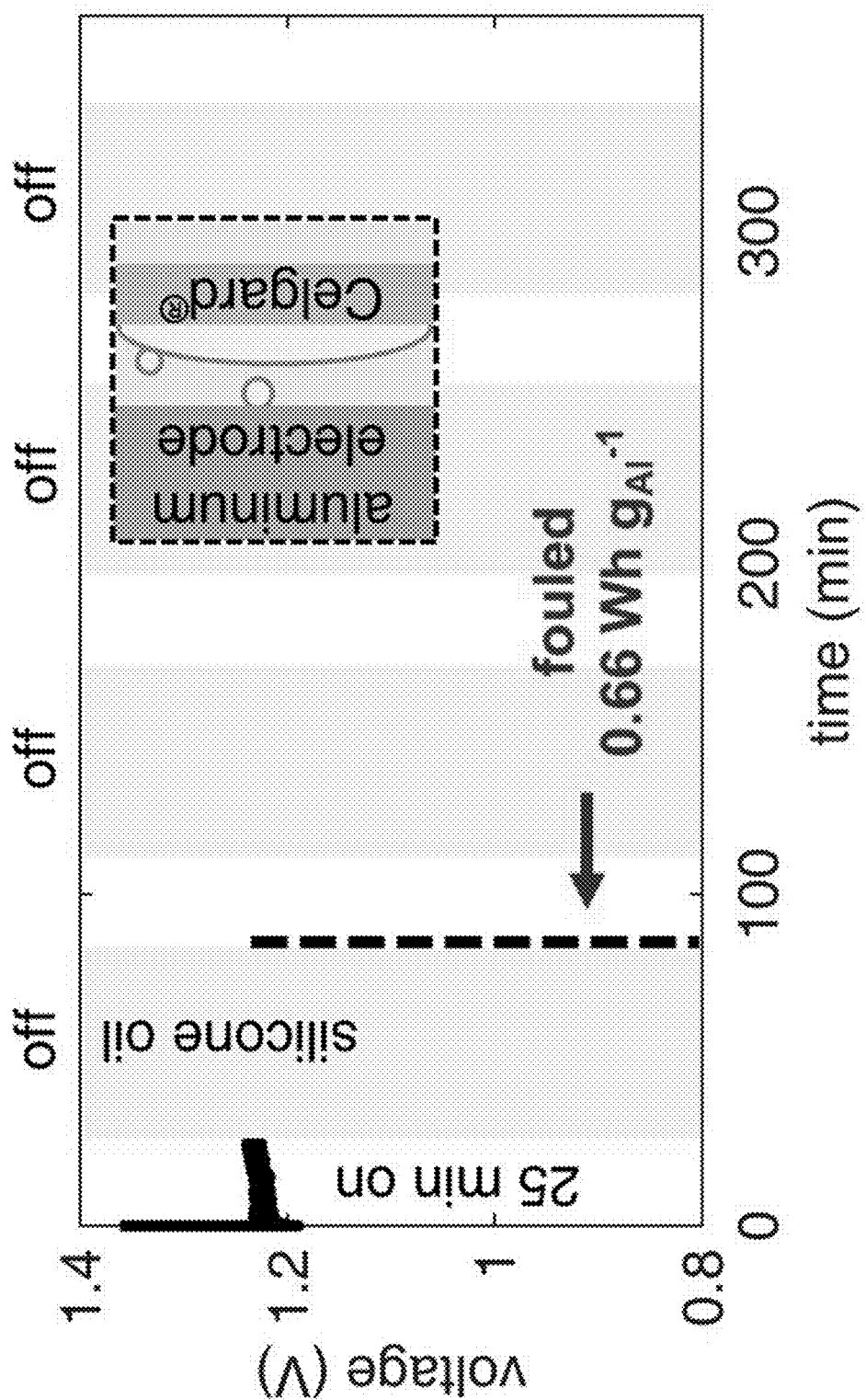
FIG. 13A is a graph of measured voltage as a function of time for on-off cycling of an Al-air cell using silicone oil as the second flowable medium and hydrophilic Celgard® 5550 as the membrane disposed between the Al-anode and the air cathode.

FIG. 13A is a graph of measured voltage as a function of time for on-off cycling of an Al-air cell using silicone oil as the second flowable medium and hydrophilic Celgard® 5550 as the membrane disposed between the Al-anode and the air cathode. After the silicone oil was pumped in, subsequent discharge voltages were negative suggesting that the silicone oil fouled the Celgard® membrane. The total energy density achieved by the silicone-Celgard® combination was 0.66±0.08 Wh $g_{Al}^{-1}$.

Figure 13B:
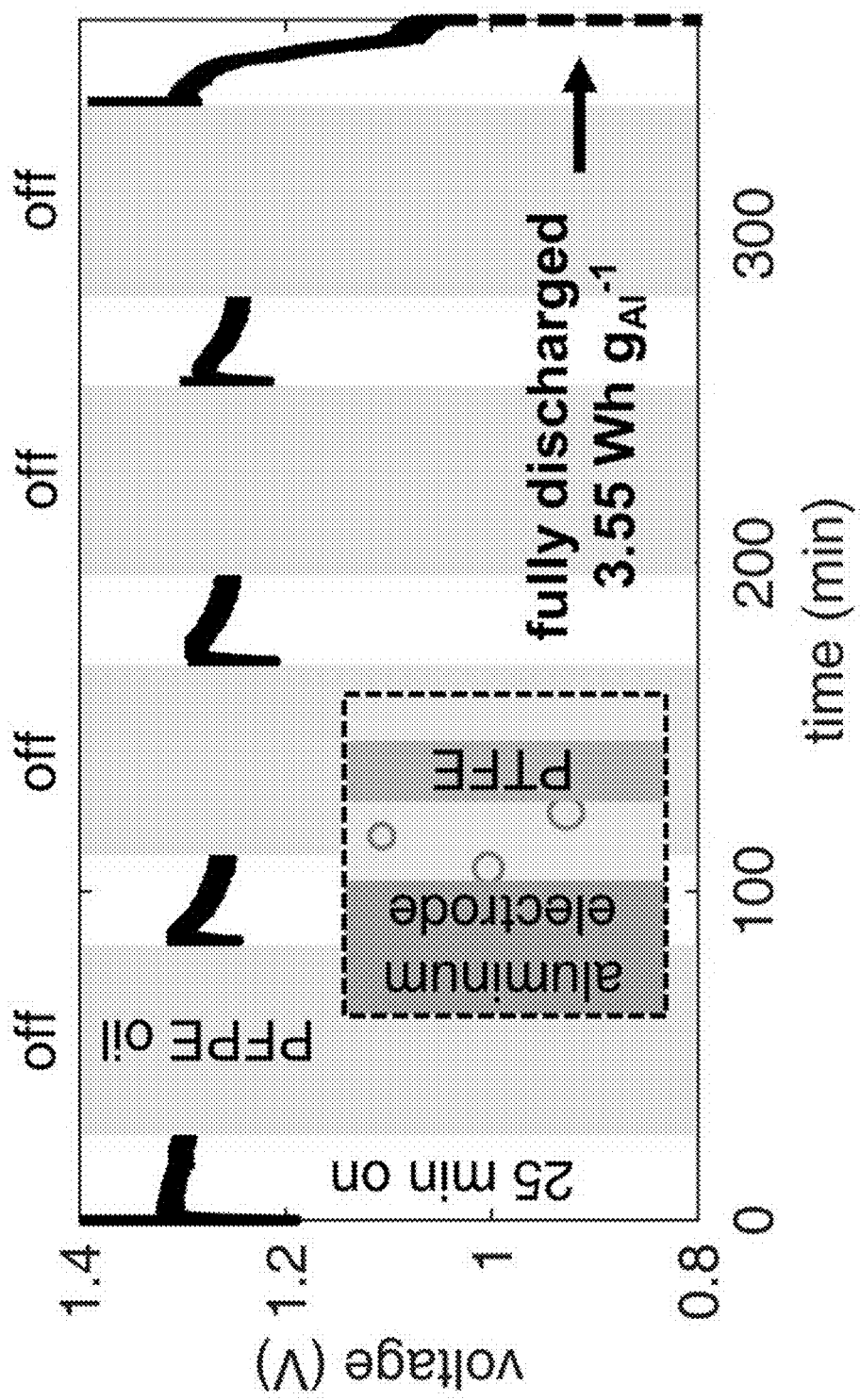
FIG. 13B is a graph of measured voltage as a function of time for on-off cycling of an Al-air cell using PFPE oil as the second flowable medium and PTFE as the membrane disposed between the Al-anode and the air cathode.

FIG. 13B is a graph of measured voltage as a function of time for on-off cycling of an Al-air cell using PFPE oil as the second flowable medium and PTFE as the membrane disposed between the Al-anode and the air cathode. In contrast to the silicone oil-Celgard® membrane, the PFPE-PTFE combination showed positive voltages after each pause. The total energy density achieved by the PFPE-PTFE combination was 3.55±0.08 Wh gAl-1, which is comparable to the energy density achieved by discharging the battery without pauses and without introducing oil, 3.54±0.08 Wh $g_{Al}^{-1}$. These energy-density results imply that the aluminum electrode and hydrophilic PTFE membrane resisted fouling by the PFPE oil.

The hydrophilic Celgard® and hydrophilic PTFE membranes were selected for testing because underwater oleophobic surfaces commonly display in-air hydrophilicity. This assessment can be drawn from a two-phase Young equation (Eq. 4) relating the wetting properties of fluids in air to the wetting properties of those fluids submerged in a different fluid.

$$\cos\theta_{o-e} = \frac{\gamma_{o-air}\cos\theta_{o-air} - \gamma_{e-air}\cos\theta_{e-air}}{\gamma_{o-e}} \quad \text{(Eq. 4)}$$

The variable $\theta_{o-e}$ is the Young contact angle of an oil droplet surrounded by electrolyte on the negative electrode or separator membrane surface. The variables $\theta_{o-air}$ and $\theta_{e-air}$ are the Young contact angles of an oil and electrolyte droplet respectively surrounded by air on either the negative electrode or separator membrane surface. The surface tension of the oil and electrolyte are respectively $\gamma_{o-air}$ and $\gamma_{e-air}$ with an oil-electrolyte interfacial tension expressed as $\gamma_{o-e}$. Equation 4 suggests that, to achieve underwater oleophobicity, where $\theta_{o-e}$ is greater than 90°, the right-hand term must be larger than the left-hand term necessitating the selection of an in-air hydrophilic negative electrode and separator membrane. Metal and metal oxides are commonly hydrophilic, which accounts for the underwater oleophobicity observed in the contact angle experiments with respect to the aluminum electrode. Equation 4 also implies that the silicone oil would display underwater oleophobicity on the Celgard® membrane if the membrane could be made more hydrophilic. Additionally, the two candidate oils were selected for their large working temperature range (−40 to 100° C.) and chemical compatibility. These candidate oils cannot saponify in high-pH electrolytes because they contain no triglycerides. The membranes were also selected for their chemical compatibilities.

Pore sizes of the tested membranes were selected using the Young-Laplace equation to facilitate suppression of the passage of oil through the pores of the respective membrane at appropriate pumping pressures. The Young-Laplace equation, $\Delta P = 4\gamma_{o-e}/D$, estimates the pressure differential, $\Delta P$, required for oil to leak through a circular pore with a diameter D given an interfacial tension between the oil and electrolyte of $\gamma_{o-e}$. For example, the interfacial tension between the electrolyte and PFPE oil was 61.6±0.1 mN m$^{-1}$. Commercially available pore diameters for hydrophilic PTFE membranes range from 0.1 to 1 μm. A pore size of 1-μm was selected to minimize resistance across the membrane. If severe thermal expansion of 100% due to numerous heating cycles is assumed, 2-μm pore diameters would allow for pressures of 123 kPa, which is two orders of magnitude higher than necessary pumping pressures in the cells tested (FIGS. 13A and 13B).

Perturbations and electrolyte pumping trigger the oil displacement by electrolyte. Without wishing to be bound by theory, it is believed that the underwater oleophobicity of the aluminum and the membrane promote rupturing of thin oil films on the respective surfaces of these materials as suggested by thin film rupture theory. Further without wishing to be bound by theory, it is believed that the perturbations and electrolyte pumping induce flow instabilities such as Saffman-Taylor, Kelvin-Helmholtz, Rayleigh-Taylor, and van der Waals that displace the oil from the electrode and membrane surfaces. For electrolyte displacement by oil, the bulk electrolyte is believed to be displaced by the flowing oil that thins the remaining electrolyte films, which are eventually consumed by corrosion on the negative electrode with sufficient time.

The performance of an Al-air battery including a hydrophilic PFPE membrane between the electrodes and an oil displacement system was characterized and found to be battery was comparable to the performance of conventional Al-air cells. The Al-air battery including the hydrophilic PTFE membrane achieved a peak power density of 300±17 mW $cm_{geo}^{-2}$ and energy density of 3.73±0.08 Wh $g_{Al}^{-1}$. Peak powers of conventional flowing-electrolyte Al-air batteries with 2 to 3-mm interelectrode gaps can range from 350 to 620 mW $cm_{geo}^{-2}$ and can obtain peak energy densities near 4.3 Wh $g_{Al}^{-1}$ while conventional flowing-electrolyte Al-Air batteries with gaps near 10 mm achieve peak powers as low as 75 mW $cm_{geo}^{-2}$ depending on cell design and operation. The values associated with the test results of the Al-air battery including the hydrophilic PTFE membrane may be attributable to the 7-mm interelectrode gap of the constructed prototype and to the added hydrophilic PTFE membrane. Without the hydrophilic PTFE membrane, the tested prototype reached a peak power of 350±17 mW $cm_{geo}^{-2}$ with the 7-mm gap. The large gap facilitated, for example, appropriate separator-membrane sealing and easy assembly and disassembly of the cell with bolts. The use of production-level sealing techniques such as laser or ultrasonic welding may facilitate achieving smaller interelectrode gap sizes.

The hydrophilic PTFE membrane, however, minimally impacted power and energy density for energy-efficient current densities below 250 mA $cm_{geo}^{-2}$. For example, at 150 mA $cm_{geo}^{-2}$, the power and energy density achieved with the Al-air battery including the hydrophilic PTFE membrane was 192±5 mW $cm_{geo}^{-2}$ and 3.54±0.08 Wh $g_{Al}^{-1}$. Excluding the hydrophilic PTFE membrane yielded an increase of only 7±6 mW $cm_{geo}^{-2}$ and 0.21±0.11 Wh $g_{Al}^{-1}$. In comparison to gel-electrolyte Al-air batteries that achieve peak powers and energy densities near 90 mW cm' and 1.2 Wh $g_{Al}^{-1}$, the power and energy density of the constructed prototype with the hydrophilic PTFE membrane represented a 230% increase in peak power and a 210% increase in energy density.

Thus, in general, the devices, systems, and methods of the present disclosure may facilitate the practical implementation of metal-air batteries for applications that require significant power and energy density with prolonged pauses in discharge. Further, or instead, the techniques described herein may be used in any of the metal-air batteries, aqueous or nonaqueous, or in other energy storage systems that suffer from corrosion using appropriate displacing oils and separator membranes according to the principles discussed herein.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A battery comprising:
   a first electrode;
   a second electrode;
   an oil for protecting the first electrode in a deactivated state of the battery;
   an aqueous electrolyte supporting electrolyte flow between the first electrode and the second electrode in an activated state of the battery; and
   a membrane between the first electrode and the second electrode, the membrane having a first side and a second side opposite the first side, the first electrode and the first side of the membrane defining a first gap therebetween, the second electrode and the second side of the membrane defining a second gap therebetween, and at least the first side of the membrane including a material along the first gap that is more wettable with the aqueous electrolyte as compared with the oil.

2. The battery of claim 1, wherein the first electrode is a metallic anode.

3. The battery of claim 2, wherein the metallic anode is at least one of iron, zinc, magnesium, aluminum, or lithium.

4. The battery of claim 1, wherein the second electrode is an air cathode permeable to oxygen.

5. The battery of claim 1, wherein the material along the first gap is hydrophilic.

6. The battery of claim 5, wherein the material along the first gap includes hydrophilic polytetrafluorethylene.

7. The battery of claim 1, wherein the membrane is permeable from the second gap to the first gap.

8. A battery system comprising:
   a first electrode;
   a second electrode;
   a membrane between the first electrode and the second electrode; and
   a fluid circuit including an actuator, a first flowable medium including an aqueous electrolyte supporting electrolyte flow between the first electrode and the second electrode in an activated state of the battery system, and a second flowable medium including an oil for protecting the first electrode in a deactivated state of the battery system, the first flowable medium including ions permeable through the membrane, and the actuator actuatable to displace the first flowable medium with the second flowable medium along a first gap at least partially defined by the first electrode and a material of the membrane, the first flowable medium having a first wetting angle on the material of the membrane, the second flowable medium having a second wetting angle on the material of the membrane, and the second wetting angle is greater than the first wetting angle such that the material of the membrane is more wettable with the first flowable medium as compared with the second flowable medium.

9. The battery system of claim 8, wherein the first flowable medium and the second flowable medium are in contact with one another at an interface in the fluid circuit.

10. The battery system of claim 9, wherein the first flowable medium has a solubility of less than about $10^{-6}$ to 1, by volume, in the second flowable medium.

11. The battery system of claim 8, wherein the first electrode is more chemically reactive with the first flowable medium than with the second flowable medium.

12. The battery system of claim 8, wherein the first flowable medium has a first electrical conductivity, and the second flowable medium has a second electrical conductivity less than the first electrical conductivity.

13. The battery system of claim 8, wherein the membrane and the second electrode at least partially define a second gap and the fluid circuit is arranged such that the first flowable medium remains in the second gap as actuation of the actuator displaces the first flowable medium with the second flowable medium in the first gap.

* * * * *